(12) United States Patent
Kusakabe et al.

(10) Patent No.: US 8,084,165 B2
(45) Date of Patent: Dec. 27, 2011

(54) MEA, MEA MANUFACTURING METHOD, AND POLYMER ELECTROLYTE FUEL CELL

(75) Inventors: Hiroki Kusakabe, Osaka (JP); Kazuhito Hatoh, Osaka (JP); Toshihiro Matsumoto, Osaka (JP); Norihiko Kawabata, Osaka (JP); Hiroaki Matsuoka, Kagawa (JP); Tomohiro Kijima, Ehime (JP)

(73) Assignee: Panasonic Corporation, Osaka (JP)

( * ) Notice: Subject to any disclaimer, the term of this patent is extended or adjusted under 35 U.S.C. 154(b) by 1124 days.

(21) Appl. No.: 11/887,370

(22) PCT Filed: Mar. 31, 2006

(86) PCT No.: PCT/JP2006/306810
§ 371 (c)(1),
(2), (4) Date: Sep. 28, 2007

(87) PCT Pub. No.: WO2006/106908
PCT Pub. Date: Oct. 12, 2006

(65) Prior Publication Data
US 2009/0136811 A1    May 28, 2009

(30) Foreign Application Priority Data

Apr. 1, 2005   (JP) .................................. 2005-105742

(51) Int. Cl.
*H01M 2/08* (2006.01)
*H01M 2/14* (2006.01)
*H01M 8/02* (2006.01)

(52) U.S. Cl. ........ 429/508; 429/483; 429/509; 429/514; 429/535

(58) Field of Classification Search .......... 429/512–514, 429/516, 523–534
See application file for complete search history.

(56) References Cited

U.S. PATENT DOCUMENTS

| 6,861,171 | B1 | 3/2005 | Suzuki | |
| 7,276,310 | B2 * | 10/2007 | Kobayashi et al. | ........... 429/483 |
| 2004/0091767 | A1 * | 5/2004 | Zuber et al. | ...................... 429/40 |
| 2004/0096730 | A1 * | 5/2004 | Kuroki et al. | ................... 429/44 |

FOREIGN PATENT DOCUMENTS

| EP | 1 465 272 A2 | 10/2004 |
| JP | 5-21077 | 1/1993 |

(Continued)

OTHER PUBLICATIONS

European Search Report issued in European Patent Application No. EP 06730758.7 dated May 25, 2010.

*Primary Examiner* — Jonathan Crepeau
*Assistant Examiner* — Muhammad Siddiquee
(74) *Attorney, Agent, or Firm* — McDermott Will & Emery LLP

(57) ABSTRACT

An MEA having an MEA body part 5C; a frame 6 made of a plate-like thermoplastic resin; and gaskets 7 formed on opposed surfaces of the frame 6 so as to hold the frame 6 between. The gaskets 7 each have an annular portion 7A that is annularly formed so as to extend along the inner periphery of the frame 6 and elongated portions 7B1 to 7B8 that extend from the annular portion 7A and come into contact with the side faces of an associated electrode layer 5C after passing over the inner periphery of the frame 6 and a peripheral region 5D of a polymer electrolyte membrane.

12 Claims, 14 Drawing Sheets

FOREIGN PATENT DOCUMENTS

| | | |
|---|---|---|
| JP | 7-220742 | 8/1995 |
| JP | 10-154521 | 6/1998 |
| JP | 2002-260693 | 9/2002 |
| JP | 2003-31237 | 1/2003 |
| JP | 2003-68319 | 3/2003 |
| JP | 2004-319461 | 11/2004 |
| WO | WO 02/061869 A1 | 8/2002 |

* cited by examiner

MEA, MEA MANUFACTURING METHOD, AND POLYMER ELECTROLYTE FUEL CELL

RELATED APPLICATIONS

This application is the U.S. National Phase under 35 U.S.C. §371 of International Application No. PCT/JP2006/306810, filed on Mar. 31, 2006, which in turn claims the benefit of Japanese Application No. 2005-105742, filed on Apr. 1, 2005, the disclosures of which Applications are incorporated by reference herein.

TECHNICAL FIELD

The present invention relates to an MEA (Membrane-Electrode-Assembly), MEA manufacturing method, and polymer electrolyte fuel cell. More particularly, the present invention relates to an MEA having gaskets that are joined to the peripheral region of an MEA body part, a manufacturing method thereof and a polymer electrolyte fuel cell using the same.

BACKGROUND ART

A polymer electrolyte fuel cell (hereinafter referred to as "PEFC") generates electric power and heat at the same time through an electrochemical reaction of a fuel gas containing hydrogen and an oxidizing gas containing oxygen etc. in its MEA body part.

Generally, PEFCs are composed of a stack of cells. A cell is formed such that the gaskets on opposed surfaces of the peripheral region of the MEA are sandwiched between a pair of electrically conductive separator plates which are, more particularly, an anode separator plate and a cathode separator plate. The MEA comprises an MEA body part and gaskets provided so as to enclose the MEA body part, being joined to a polymer electrolyte membrane that extends in the peripheral region of the MEA body part, or a combination of a frame and gaskets. The MEA body part is composed of a polymer electrolyte membrane and a pair of electrode layers formed on opposed surfaces of the polymer electrolyte membrane. The surfaces of the electrode layers are exposed to fuel gas and oxidizing gas respectively, thereby causing an electrochemical reaction, while leakage of the fuel gas and oxidizing gas to the outside being shut off or restrained by the gaskets or the frame/gaskets.

One of the serious problems presented by PEFCs is a decline in the fuel gas and oxidizing gas utilization efficiencies. Concretely, there is difficulty in bringing the inner peripheries of the gaskets into perfect contact with the outer peripheries of the electrode layers for the reason such as restraints on the processing steps. That is, a gap (hereinafter referred to as "MEA body part peripheral gap") is created between the inner periphery of each gasket and the outer periphery of its associated electrode layer. During operation of the PEFC, the fuel gas and oxidizing gas leak into the MEA body part peripheral gaps and are mostly discharged to the outside without being exposed to the MEA body part with the result that the fuel gas and oxidizing gas utilization efficiencies and, in consequence, the efficiency of the polymer electrolyte fuel cell drop. For example, Patent Document 1 has proposed a gasket that is made from a specific rubber material for covering and sealing off the outer periphery of an electrode layer and is integrally formed with the polymer electrolyte membrane.

Patent Document 1: Japanese Unexamined Patent Application Publication No. 2001-155745

DISCLOSURE OF THE INVENTION

The Problem that the Invention Intends to Solve

The gasket disclosed in Patent Document 1, however, has revealed the problem that lots of labor are required for bringing the gasket into close and uniform contact with the periphery of the electrode layer in a just-fit manner, so that at least it is not suited for mass-production. The applicant has proposed, in the previous applications (Japanese Application Nos. 2003-298628 and 2004-296702 both of which are not yet published), MEAs in which a part of the MEA body part peripheral gaps is closed or partially closed. Of these proposals, the proposals (Japanese Application Nos. 2003-298628 and 2004-296702) in which a plurality of gaskets are disposed around the electrode layers require an increased number of steps for manufacture of the MEA. The proposal (Japanese Application No. 2003-298628) involving electrode layers the peripheries of which are intricate in shape requires high accuracy for the MEA manufacturing process. The proposal (Japanese Application No. 2003-298628), in which the electrode layers are produced after provision of the gaskets around the peripheral region of the polymer electrolyte membrane, cannot form a plurality of electrode layers in the large polymer electrolyte membrane at a time. Therefore, after the polymer electrolyte membrane has been cut into pieces having a required size and the frame and gasket have been provided therein, the electrode layers have to be formed on each polymer electrolyte membrane piece. As discussed just above, these MEA manufacturing processes have left room for improvement.

The present invention is directed to overcoming the foregoing problems and a primary object of the invention is therefore to provide an MEA, an MEA manufacturing process, and a polymer electrolyte fuel cell having the MEA, which MEA is capable of shutting off or restraining flows of the fuel gas and oxidizing gas in the MEA body part peripheral gaps when the polymer electrolyte fuel cell is in an assembled condition, and which MEA is simple in structure and its manufacturing method so as to be suited for mass production.

Means of Solving the Problems

The inventors have made intensive researches to develop a structure and manufacturing method of an MEA in which parts of the MEA body part peripheral gaps can be closed or narrowed and which is suited for mass production. First, they examined MEA manufacturing processes and obtained the following knowledge. In the process in which electrode layers are formed on a polymer electrolyte membrane after formation of gaskets or frames/gaskets on the polymer electrolyte membrane, a step of forming electrode layers on every MEA is necessary. In contrast with this, if the process in which a frame is formed on a polymer electrolyte membrane having electrode layers formed thereon is employed, the MEA body part can be mass-produced by cutting the polymer electrolyte membrane after formation of a plurality of electrode layers on the polymer electrolyte membrane. In short, they found that the manufacturing process, in which a frame is formed on a polymer electrolyte membrane having electrode layers formed thereon, that is, the MEA body part, is preferable.

Next, they examined the structures in which gaskets or frame/gaskets are provided on the peripheral region of the MEA body part. In view of simplicity, the structure in which only gaskets are provided without use of a frame is preferable. However, the structure having only gaskets is liable to cross-leak of the fuel gas and oxidizing gas because the gaskets are elastic, as discussed earlier in conjunction with Japanese Application No. 2004-296702. Therefore, the inventors investigated layouts/structures and manufacturing methods for the frame and gaskets and found that frames could be continuously formed with a molding machine by making the frame from thermoplastic resins and the gaskets from at least one material selected from the group consisting of thermoplastic resins and thermoplastic elastomers. In addition, they found that parts of the MEA body part peripheral gaps can be closed or narrowed by employing ingenious layouts/structures for the gaskets. As the result of these investigations, the inventors have made the present invention.

According to a first aspect of the invention, there is provided an MEA comprising: an MEA body part having a polymer electrolyte membrane and a pair of electrode layers that are formed on opposed surfaces, respectively, of the polymer electrolyte membrane, which are located inward of a peripheral region of the polymer electrolyte membrane; a frame that sandwiches the peripheral region of the polymer electrolyte membrane at a position spaced from the pair of electrode layers and encloses an outer periphery of the polymer electrolyte membrane; and a pair of gaskets that are formed on opposed surfaces of the frame so as to sandwich the frame therebetween and are made of at least one material selected from a group consisting of thermoplastic resins and thermoplastic elastomers, wherein the gaskets each have an annular portion that is annularly formed so as to extend along an inner periphery of the frame and elongated portions that extend from the annular portion, pass over the inner periphery of the frame and the peripheral region of the polymer electrolyte membrane, and come into contact with side faces of their associated one of the electrode layers.

In the MEA constructed as described above, flows of fuel gas and oxidizing gas within the MEA body part peripheral gaps when the polymer electrolyte fuel cell is in an assembled condition can be shut off or restrained so that the fuel gas and oxidizing gas utilization efficiencies can be increased. In addition, the MEA is simple in structure and therefore suited for mass-production. In this invention, "an annular portion that is annularly formed so as to extend along an inner periphery of the frame" as stated herein means that an annular portion annularly formed so as to extend along the inner periphery (opening) of the frame as viewed in plan. It should however be noted that the annular portion does not need to extend along the inner periphery (opening) of the frame in the areas where the passages for flowing the fluids to be fed to the MEA are formed (see, for example, FIG. 3 described later). "Viewed in plan" as stated herein means viewing in a thickness-wise direction of the plate-like frame.

In this invention, "the MEA body part" means a layered part constituted by at least an anode (gas diffusion electrode) and a cathode (gas diffusion electrode) and a polymer electrolyte membrane disposed between the anode (gas diffusion electrode) and the cathode (gas diffusion electrode).

According to a twelfth aspect of the invention, there is provided an MEA manufacturing method comprising the steps of: feeding a thermoplastic resin into a gap between a first die and a second die to form a first frame-like molded member having, on an inner peripheral side thereof, a flat part in which a peripheral region of an MEA body part is to be positioned; placing the MEA body part that has been prepared beforehand in a flat manner within the frame-like molded member fit in the first die and placing a peripheral region of the MEA body part on the flat part; forming a frame connected to the MEA body part by coupling a third die with the first die in which the molded member having the MEA body part arranged therein is fit and, then, feeding the thermoplastic resin into a gap between the first die and the third die; and forming gaskets on surfaces of the frame by coupling a fourth die and fifth die with each other with the frame having the MEA body part joined thereto being held therebetween and then feeding a thermoplastic resin or thermoplastic elastomer into a gap between the fourth die and the fifth die. Such an MEA manufacturing method is simply designed and therefore suited for mass-production. In addition, the MEA manufactured by this method is formed such that flows of the fuel gas and oxidizing gas within the MEA body part peripheral gaps when the polymer electrolyte fuel cell is in an assembled condition can be shut off or restrained so that the fuel gas and oxidizing gas utilization efficiencies can be increased.

According to a thirteenth aspect of the invention, there is provided a polymer electrolyte fuel cell comprising a stack of one or more cells each having the MEA recited in the first aspect and anode and cathode separators that sandwich the MEA therebetween. In the polymer electrolyte fuel cell as described above, flows of the fuel gas and oxidizing gas within the MEA body part peripheral gaps can be shut off or restrained so that the fuel gas and oxidizing gas utilization efficiencies can be increased.

According to a second aspect of the invention, the MEA may be used in a polymer electrolyte fuel cell having a separator plate provided with communicating passage grooves each of which is formed so as to extend from a surface in contact with either of the electrode layers to a surface facing an area around the electrode layer, and the MEA may be such that the elongated portions are formed on both sides of positions of the MEA which the communicating passage grooves respectively contact. In this arrangement, leakage of the fuel gas from the communicating passage grooves to the MEA body part peripheral gap can be shut off or restrained so that the effects of the invention just described above can be more unfailingly obtained.

According to a third aspect of the invention, the MEA may be used in a polymer electrolyte fuel cell having a separator plate in which a passage groove is formed in a surface in contact with either of said electrode layers which passage groove has bent portions in a peripheral region of said electrode layer, and the MEA may be such that the elongated portions are located in positions of the MEA at which the regions between the bent portions respectively contact. In this arrangement, the fuel gas and oxidizing gas leaking from the bent portions to the MEA body part peripheral gaps can be prevented or restrained from flowing within the MEA body part peripheral gaps so that the effects of the invention just described above can be more unfailingly obtained.

According to a fourth aspect of the invention, the MEA may be used in a polymer electrolyte fuel cell having a separator plate in which a plurality of said bent portions are formed, and the MEA may be such that the elongated portions are formed only in a part of the positions of the MEA which regions between the bent portions contact. Such an MEA is simpler in structure.

According to a fifth aspect of the invention, the MEA may be such that a composition of the frame and a composition of the gaskets include the same plastic component. In this arrangement, the frame and the gaskets can be thermally fused together to achieve strong contact.

According to a sixth aspect of the invention, the MEA may be such that fore ends of the elongated portions of the gaskets are formed so as to cover substantially entire side faces of the electrode layers. In this arrangement, an outflow of the gases from the side faces of the electrode layers can be substantially thoroughly prevented by the elongated portions so that flows of the fuel gas and oxidizing gas within the MEA body part peripheral gaps when the polymer electrolyte fuel cell is in an assembled condition can be more unfailingly shut off or restrained.

According to an seventh aspect of the invention, the MEA may be such that a frame-like protective film is further disposed on the peripheral region of at least one of two main surfaces of the polymer electrolyte membrane, for protecting the peripheral region; the electrode layers each have a layered structure that includes a gas diffusion layer and a catalyst layer disposed between the gas diffusion layer and the polymer electrolyte membrane; and an inner periphery of the protective film fits in a space between the catalyst layer and the gas diffusion layer. In this arrangement, damage to the peripheral region of the polymer electrolyte membrane during manufacture of the MEA can be prevented.

According to an eighth aspect of the invention, the MEA may be such that a frame-like protective film is further disposed on the peripheral region of at least one of two main surfaces of the polymer electrolyte membrane, for protecting the peripheral region; and the protective film and associated one of the electrode layers are apposed on the main surface of the polymer electrolyte membrane so as not to overlap each other. In this arrangement, damage to the peripheral region of the polymer electrolyte membrane during manufacture of the MEA can be prevented.

According to a ninth aspect of the invention, the MEA may be such that a frame-like protective film is further disposed on the peripheral region of at least one of two main surfaces of the polymer electrolyte membrane, for protecting the peripheral region; the electrode layers each have a layered structure that includes a gas diffusion layer and a catalyst layer disposed between the gas diffusion layer and the polymer electrolyte membrane; and an inner periphery of the protective film fits in the space between the polymer electrolyte membrane and the catalyst layer. In this arrangement, damage to the peripheral region of the polymer electrolyte membrane during manufacture of the MEA can be prevented.

According to a tenth aspect of the invention, the MEA may be such that a rib is formed on a top face of the annular portion of each gasket so as to extend in an extending direction of the annular portion, and at least a part of the rib is formed inward of the peripheral region of the polymer electrolyte membrane. In this arrangement, when the polymer electrolyte fuel cell is in an assembled condition, the degree of adhesion and joint strength of the peripheral region of the polymer electrolyte membrane and the frame can be enhanced by the pressing forces of the ribs provided on the annular portions on the front and rear faces of the MEA.

According to an eleventh aspect of the invention, the MEA may be such that fore ends of the elongated portions of each gasket are thinly elongated and run onto surfaces of the electrode layers.

In this arrangement, the degree of adhesion between the elongated portions and the side surfaces of each electrode layer can be further increased so that flow of the fuel gas and oxidizing gas in the MEA body part peripheral gaps when the polymer electrolyte fuel cell is in an assembled condition can be more unfailingly shut off or restrained.

These objects as well as other objects, features and advantages of the invention will become apparent to those skilled in the art from the following detailed description of preferred embodiments with reference to the accompanying drawings.
Effects of The Invention As has been described above, the MEA, MEA manufacturing method, polymer electrolyte fuel cell having the MEA according to the invention are capable of shutting off or restraining flows of fuel gas and oxidizing gas within the MEA body part peripheral gaps in a polymer electrolyte fuel cell assembled condition, so that the fuel gas and oxidizing gas utilization efficiencies can be increased and the MEA can be simplified in terms of its configuration and manufacturing method and well suited for mass production.

EXPLANATION OF REFERENCE NUMERALS

Figure 1:
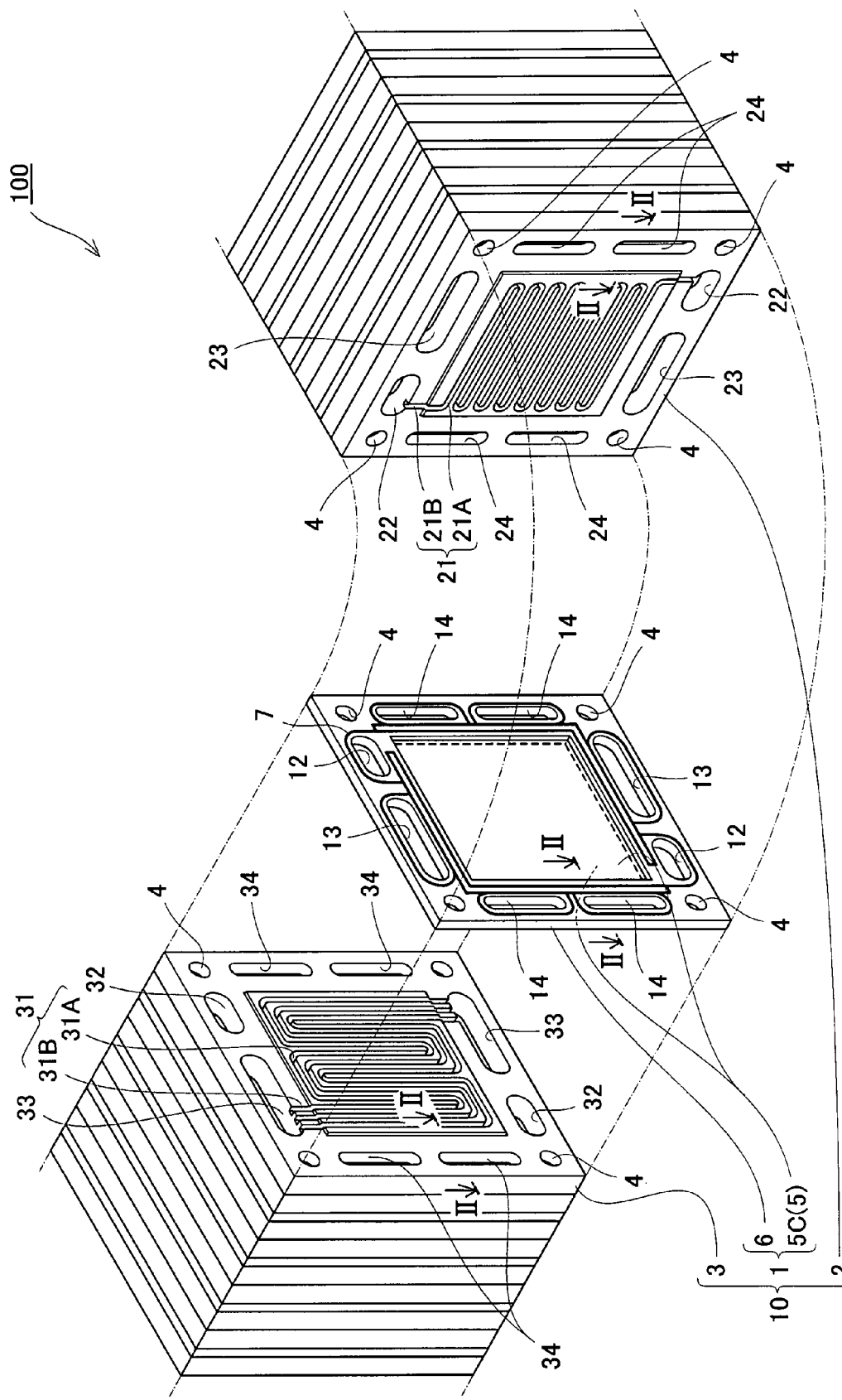
FIG. 1 is a partially exploded perspective view diagrammatically showing a structure of a polymer electrolyte fuel cell according to a preferred embodiment of the invention.

1: MEA
2: anode separator plate
3: cathode separator plate
4: bolt hole
5: MEA body part
5A: polymer electrolyte membrane
5B: catalyst layer
5C: gas diffusion layer 5D: peripheral region
6: frame
6A: groove
6B: through hole for molding
6C: molded member
6C1: flat part
6D: MEA body fixed part
7: gasket
7A: annular portion
7B: elongated portion
7B1: first elongated portion
7B2: second elongated portion
7B3: third elongated portion
7B4: fourth elongated portion
7B5: fifth elongated portion
7B6: sixth elongated portion
7B7: seventh elongated portion
7B8: eighth elongated portion
7C: rib
7D: overlap part
9: sealing member
10: cell
11A: external joint part
11B: internal joint part
12, 22, 32: fuel gas manifold hole
13, 23, 33: oxidizing gas manifold hole
14, 24, 34: water manifold hole
21: fuel gas passage groove
21A: gas diffusion layer contact portion
21B: communicating portion
21C: bent portion
31: oxidizing gas passage groove
31A: gas diffusion layer contact portion
31B: communicating portion
31C: bent section
40: MEA body part peripheral gap
50: water passage groove
60: protective film
100: polymer electrolyte fuel cell (PEFC)
T1: first die
T1A: recessed part
T1B: flat part
T1C: frame body part
T1D: convex part
T2: second die
T2B: flat part
T2C: frame body part
T2D: convex part
T3: third die
T3A: recessed part
T4: fourth die
T5: fifth die
P: example
Q: comparison
S: frame face
V: output voltage
H: time

BEST MODE FOR CARRYING OUT THE INVENTION

Referring now to the accompanying drawings, the best mode for carrying out the invention will be described.

FIG. 1 is a partially exploded perspective view diagrammatically showing a structure of a polymer electrolyte fuel cell according to a preferred embodiment of the invention.

As illustrated in FIG. 1, a PEFC 100 is composed of a stack of cells 10. Although not shown in the drawing, a power collector plate, an insulating plate and an end plate are attached to each of the outermost layers located at the ends of the stack of cells 10. The cells 10 are fastened together by means of fastening bolts and nuts, the bolts being inserted from the ends of the stack of cells 10 so as to pass through bolt holes 4. In this embodiment, sixty cells 10 are stacked, and the bolts passing through the bolt holes 4 and the nuts are fastened by a fastening power of 10 kN.

The cells 10 are each formed such that a frame 6 (more specifically, gaskets 7) formed on the opposed surfaces of a peripheral region of an MEA 1 is sandwiched between a pair of electrically conductive separator plates, i.e., an anode separator plate 2 and a cathode separator plate 3. Thereby, gas diffusion layers 5C, which are the respective outermost layers of the electrode layers of an MEA body part 5, are in contact with the separators 2, 3 respectively, and a gas diffusion layer contact portion 21A of a fuel gas passage groove 21 provided in the anode separator plate 2 and a gas diffusion layer contact portion 31A of an oxidizing gas passage groove 31 provided in the cathode separator plate 3 are covered with the gas diffusion layers 5C. That is, the gas diffusion layer 5C located on the anode separator plate 2 side is exposed to the fuel gas flowing in the gas diffusion layer contact portion 21A whereas the gas diffusion layer 5C located on the cathode separator plate 3 side is exposed to the fuel gas flowing in the gas diffusion layer contact portion 31A, so that an electrochemical reaction occurs in the PEFC 100. In the stack of cells 10, the adjoining MEA body parts 5 are electrically connected to each other in series, or in parallel as the case may be.

The separators plates 2, 3 and the peripheral region of the MEA 1, i.e., the frame 6 are respectively provided with pairs of through holes which are pairs of fuel gas manifold holes 12, 22, 32 for flowing the fuel gas and pairs of oxidizing gas manifold holes 13, 23, 33 for flowing the oxidizing gas. In a condition that the cells 10 are stacked, the corresponding through holes overlap and communicate with one another, forming a fuel gas manifold and an oxidizing gas manifold. The inner main surface of the anode separator plate 2 is provided with a fuel gas passage groove 21 such that the groove 21 connects the pair of fuel gas manifold holes 22. The inner main surface of the cathode separator plate 3 is provided with an oxidizing gas passage groove 31 such that the groove 31 connects the pair of oxidizing gas manifold holes 33. Specifically, the oxidizing gas and the fuel gas branch off from one manifold (i.e., the supply side manifold) so as to flow into the passage grooves 21, 31 respectively and, after flowing therein, they go to the other manifold (i.e., the discharge side manifold).

The fuel gas passage groove 21 is composed of the gas diffusion layer contact portion 21A formed on a surface that is in contact with one gas diffusion layer 5C and a pair of communicating portions (communicating passage grooves) 21B each extending from a surface in contact with the gas diffusion layer 5C to a surface facing an area around the gas diffusion layer 5C, when the cells 10 are in an assembled condition. Similarly, the oxidizing gas passage groove 31 is composed of the gas diffusion layer contact portion 31A formed on a surface that is in contact with the other gas diffusion layer 5C and a pair of communicating portions (communicating passage grooves) 31B each extending from a surface in contact with the gas diffusion layer 5C to a surface facing an area around the gas diffusion layer 5C when the cells 10 are in an assembled condition. Herein, the communicating portions 21B (31B) are each so formed as to connect the pair of manifold holes 22 (33) to the gas diffusion layer contact portion 21A (31A). Thereby, the oxidizing gas and the fuel gas branch off from the supply side fuel gas manifold hole 22 and the supply side oxidizing gas manifold hole 33 respectively to flow into the communicating portions 21B, 31B respectively, so that the gas diffusion layers 5C are exposed to the fuel gas and the oxidizing gas flowing in the gas diffusion layer contact portions 21A, 31A, thereby causing an electrochemical reaction. Redundant gas and products generated in the reaction are discharged to the discharge side fuel gas manifold hole 22 and discharge side oxidizing gas manifold hole 33 by way of the communicating portions 21B, 31B connected to the discharge side fuel gas manifold hole 22 and discharge side oxidizing gas manifold hole 33, respectively.

The gaskets 7 are provided on opposed surfaces, respectively, of the frame 6 of the MEA 1 so as to sandwich the frame 6. The gaskets 7 are so disposed as to prevent the oxidizing gas and fuel gas from leaking from the passage grooves 21, 31. Concretely, the gaskets 7 extend around the manifold holes 12, 13, 14 and around the frame 6. Herein, on the anode separator plate 2 side of the MEA 1, the gasket 7 is not disposed in the areas which the communicating portions 21B of the fuel gas passage groove 21 contact when the cells 10 are in an assembled condition and is disposed such that the fuel gas manifold holes 12 and the MEA body part 5 are integrally enclosed by the gasket 7. Similarly, on the cathode separator plate 3 side of the MEA 1, the gasket 7 is not disposed in the areas which the communicating portions 31B of the oxidizing gas passage groove 31 contact when the cells 10 are in an assembled condition and is disposed such that the oxidizing gas manifold holes 13 and the MEA body part 5 are integrally enclosed by the gasket 7.

With the configuration described above, the gaskets 7 do not act as a resistance against the fuel gas flowing between the fuel gas manifold holes 12 and the MEA body part 5 and against the oxidizing gas flowing between the oxidizing gas manifold holes 33 and the MEA body part 5, and leakage of the fuel gas and oxidizing gas to the outside can be shut off or restrained by the gaskets 7. In FIG. 1, the elongated portions 7B (see FIGS. 3, 4) and ribs 7C (see FIG. 2) of the gaskets 7 are omitted for convenience of illustration. It should be noted that FIG. 1 shows, in enlarged form, the meandering configurations of the gas diffusion layer contact portions 21A, 31A of the passage grooves 21, 31 of the separator plates 2, 3 for the sake of easy understanding and therefore the passage structures of the passage grooves 21, 31 shown in FIG. 1 do not coincide with those shown in FIGS. 3, 4, 9, 10 and 15.

The manifolds used herein may be constructed by the so-called, external manifolds. In this case, the fuel gas manifold holes 12, 22, 32 and the oxidizing gas manifold holes 13, 23, 33 are not formed in the MEA 1 and the separator plates 2, 3, and the communicating portions 21B, 31B of the fuel gas passage groove 21 and oxidizing gas passage groove 31 are formed so as to extend to the end faces of their associated separator plates 2, 3 respectively. Pipelines for feeding the fuel gas and the oxidizing gas respectively diverge so as to join to the end faces of the separator plates 2, 3. In the case of the external manifolds, the gaskets 7 are so formed as to extend to the end faces of the frame 6, after running around the communicating portions 21B, 31B of the fuel gas passage groove 21 and oxidizing gas passage groove 31, respectively.

Similarly to the fuel gas manifold holes 12, 22, 32 and the oxidizing gas manifold holes 13, 23, 33, water manifold holes 14, 24, 34 are provided in the separator plates 2, 3 and in the peripheral region of the MEA 1 to form two pairs of manifolds for flowing water. When the cells 10 are in a stacked condition, the corresponding water manifold holes overlap one another, forming the two pair of water manifolds.

Figure 2:
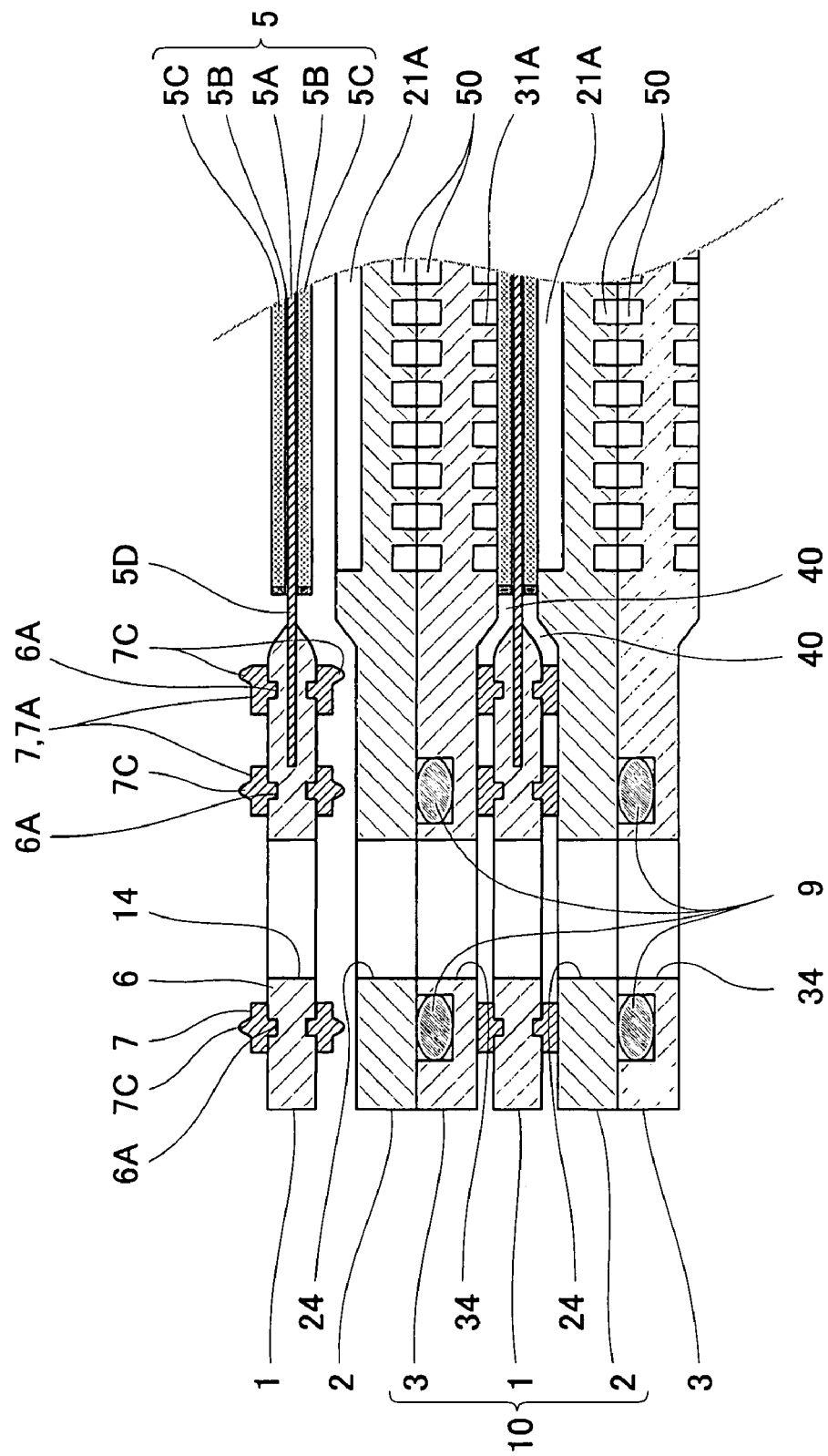
FIG. 2 is a partially exploded cross-sectional view of a stacked cell 10 taken along line II-II of FIG. 1.

FIG. 2 is a partially exploded cross-sectional view of the stacked cell 10 taken along line II-II of FIG. 1.

The MEA body section 1 is constituted by a polymer electrolyte membrane 5A for selectively transporting hydrogen ions and a pair of electrode layers (i.e., an anode electrode layer and a cathode electrode layer) formed on opposed surfaces, respectively, of a portion of the polymer electrolyte membrane 5A, the portion being located inward of the peripheral region of the membrane 5A. Each electrode layer has a layered structure that includes the gas diffusion layer 5C and catalyst layer 5B located between the gas diffusion layer 5C and the polymer electrolyte membrane 5A. Typically, the catalyst layers 5B contain carbon powder carrying a platinum group metal catalyst as a chief component, and are formed on the surfaces of the polymer electrolyte membrane 5A. The gas diffusion layers 5C are formed on the outer surfaces of the catalyst layers 5B respectively and have air permeability and electron conductivity.

The anode separator plate 2 and cathode separator plate 3 are a flat plate. Their inner surfaces, which are respectively in contact with the MEA 1, have a step corresponding to the shape of the MEA 1 and, more particularly, the step caused by the difference between the frame 6 and the MEA body part 5 in thickness, such that the central parts of the separators 2, 3 project, taking the form of a trapezoid. Herein, glassy carbon (thickness: 3 mm) produced by Tokai Carbon Co., Ltd. is used as the anode separator plate 2 and the cathode separator plate 3. In the separator plates 2, 3, the manifold holes 22, 23, 24, 32, 33, 34 and bolt holes 4 pass through the separator plates 2, 3 in a thickness-wise direction. Formed in the inner surfaces of the separators 2, 3 are the fuel gas passage groove 21 and the oxidizing gas passage groove 31 respectively, whereas the rear surfaces of the separators 2, 3 are each provided with a water passage groove 50. The manifold holes 22, 23, 24, 32, 33, 34; the bolt holes 4; the fuel gas passage groove 21; the oxidizing gas passage groove 31; and the water passage grooves 50 etc. are formed by cutting or molding.

The water passage grooves 50 are so formed as to connect the two pairs of water manifold holes 24, 34. Concretely, each water passage groove 50 is constructed such that water diverges from one (i.e., the supply side manifold) of the water manifolds in each pair to flow into the water passage groove 50 and then go to the other manifold (i.e., the discharge side manifold hole). Thereby, the cells 10 can be kept at a specified temperature appropriate for the electrochemical reaction, owing to the heat transfer property of water. Like the fuel gas and oxidizing gas, the cooling water supply and discharge passages may be constructed so as to have the external manifold structure instead of providing the water manifold holes 14, 24 in the separator plates 2, 3 and the peripheral region of the MEA 1. Alternately, the cells 10 may be stacked such that a cooling unit for circulating cooling water is inserted between every adjacent cells 10, instead of forming the water passage grooves 50 at the rear surfaces of the separator plates 2, 3.

The gaskets 7 are made of an elastic material and deformed by the pressing forces of the MEA 1 and the separator plates 2, 3 in correspondence with the configuration of the separator plates 2, 3 so that the MEA body part 5 and the water manifold holes 14 are sealed off from the circumferences. Similarly, the fuel gas manifold holes 12 and the oxidizing gas manifold holes 13 are sealed off from their circumferences by the gaskets 7 (see FIG. 3). As illustrated in FIG. 2, ribs 7C are formed on the top faces of the gaskets 7, extending in the extending direction of the gaskets 7. Since the pressing forces are concentrated on the ribs 7C when the cells 10 are in an assembled condition, the peripheries of the manifold holes 12 to 14 and the MEA body part 5 can be more properly sealed off from their circumferences. In short, the provision of the ribs 7C provides more reliable sealing function of the gaskets 7.

The frame 6 is made of a thermoplastic resin. This thermoplastic resin is chemically clean and stable under the operating temperature of the PEFC100 and has moderate elasticity modulus and relatively high deflection temperature under load. For instance, in cases where the fuel gas passage groove 21 and oxidizing gas passage groove 31 of the separator plates 2, 3 have a width of about 1 to 2 mm and the frame 6 has a thickness of approximately 1 mm or less, the compressive elasticity modulus of the material of the frame 6 is preferably at least 2000 MPa or more. The elasticity modulus as stated herein is compressive elasticity modulus measured by the compressive elasticity modulus measurement method prescribed by JIS-K7181. Since the operation temperature for the PEFC100 is generally 90° C. or less, the deflection temperature of the frame 6 under load is preferably 120° C. or more. In view of chemical stability, the frame 6 is preferably made of not an amorphous resin but a crystalline resin. Among crystalline resins, resins having great mechanical strength and high heat resistance are preferably used.

For instance, resins of the so-called super engineering plastic grade are preferable. Examples of such resins include polyphenylene sulfide (PPS), polyether ether ketone (PEEK), liquid crystalline polymer (LCP), polyether nitryl (PEN). These resins are preferable because they have compressive elasticity modulus ranging from several thousands to several tens of thousands MPa and a deflection temperature of 150° C. or more under load. Another favorable material is polypropylene filled with glass filler (GFPP). Although GFPP is a multipurpose resin material, it is suitably used because it has elasticity modulus several times higher than the compressive elasticity modulus (1000 to 1500 MPa) of polypropylene with no filler and a deflection temperature of nearly 150° C. under load. In this embodiment, glass filler added PPS (produced by Dainippon Ink And Chemicals, Incorporated under the name of DIC-PPS FZ1140-B2), which is a thermoplastic resin, is used.

The gaskets 7 are made from at least one material selected from the group consisting of thermoplastic resins and thermoplastic elastomers. The thermoplastic resins and thermoplastic elastomers are chemically stable and exhibit resistance to hot water (particularly, they do not cause hydrolysis) at temperatures equal to and lower than the operation temperature of the PEFC 100. The compressive elasticity modulus of the gaskets 7 is preferably 200 MPa or less. The gaskets 7 are made from at least one kind of material selected from the group consisting of polyethylene, polypropylene (PP), ethylene-propylene-diene methylene linkage (EPDM) polybutylene, polystyrene, polyvinyl chloride, polyvinylidene chloride, polyvinyl alcohol, polyacrylamide, polyamide, polycarbonate, polyacetal, polyurethane, silicone, fluorocarbon resin, polybutylene terephthalate, polyethylene terephthalate, polyethylene naphthalate, syndiotactic polystyrene, polyphenylene sulfide, polyether ether ketone, polyether ketone, liquid crystalline polymer, polyethernitrile, modified polyphenylene ether, polysulfone, polyethersulfone, polyarylate, polyamide-imide, polyetherimide and thermoplastic polyimide. With the above material, good sealing properties can be obtained under the fastening load of the PEFC. In this embodiment, Suntplene 8101-55 (produced by Advanced Elastomer System Co., Ltd.), which is a polyolefin-based thermoplastic elastomer containing PP and EPDM, is used.

A general sealing member 9 such as squeezed packing made from a heat-resistant material is disposed on the rear surfaces of the anode separator plate 2 and the cathode separator plate 3 around the manifold holes. This prevents leakage of the fuel gas, oxidizing gas and water from the connected parts of the adjacent cells 10 at the manifold holes 22, 23, 24, 32, 33, 34.

Figure 3:
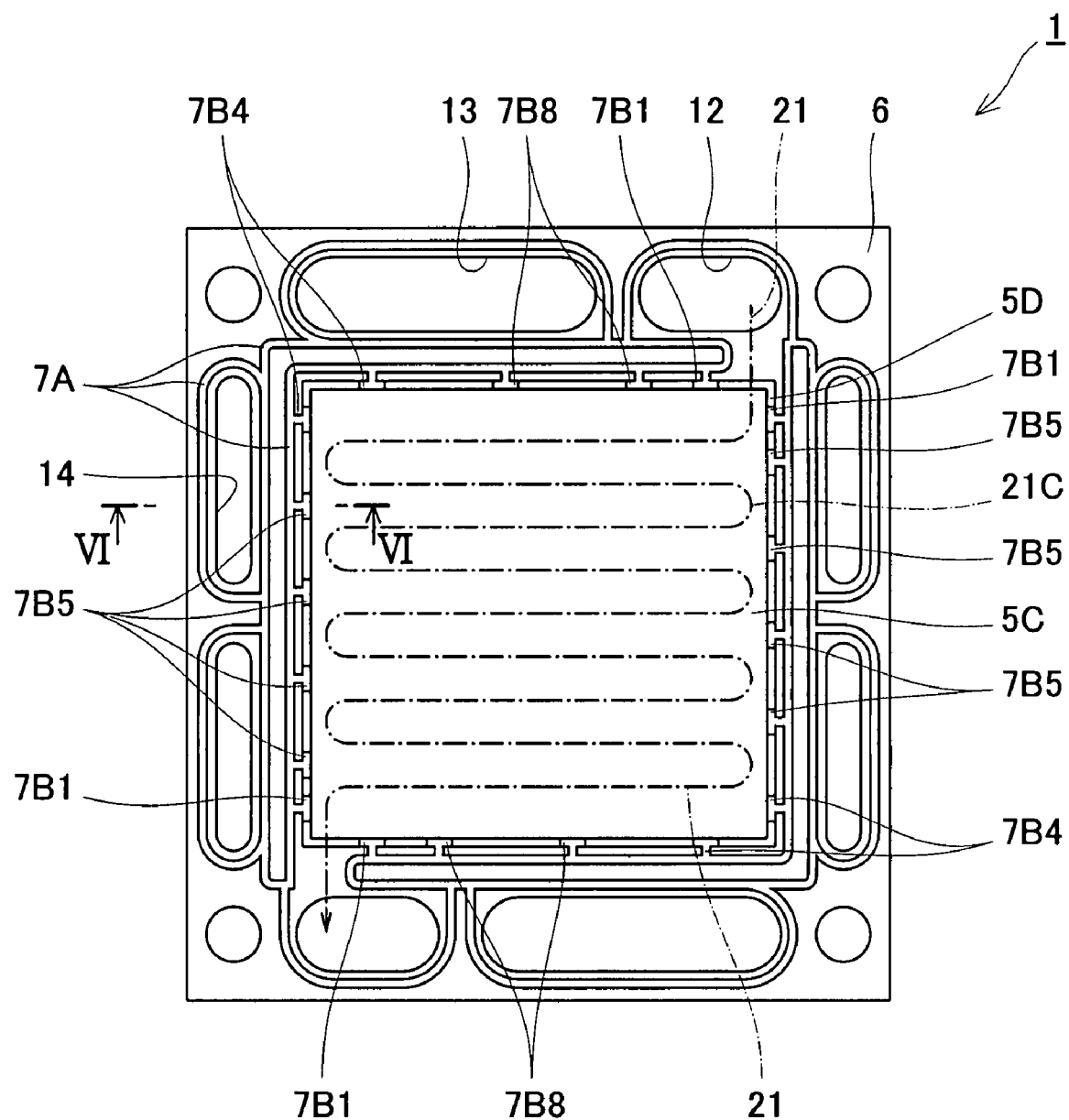
FIG. 3 is a plan view of a structure of the anode separator side of the MEA shown in FIG. 1.
Figure 4:
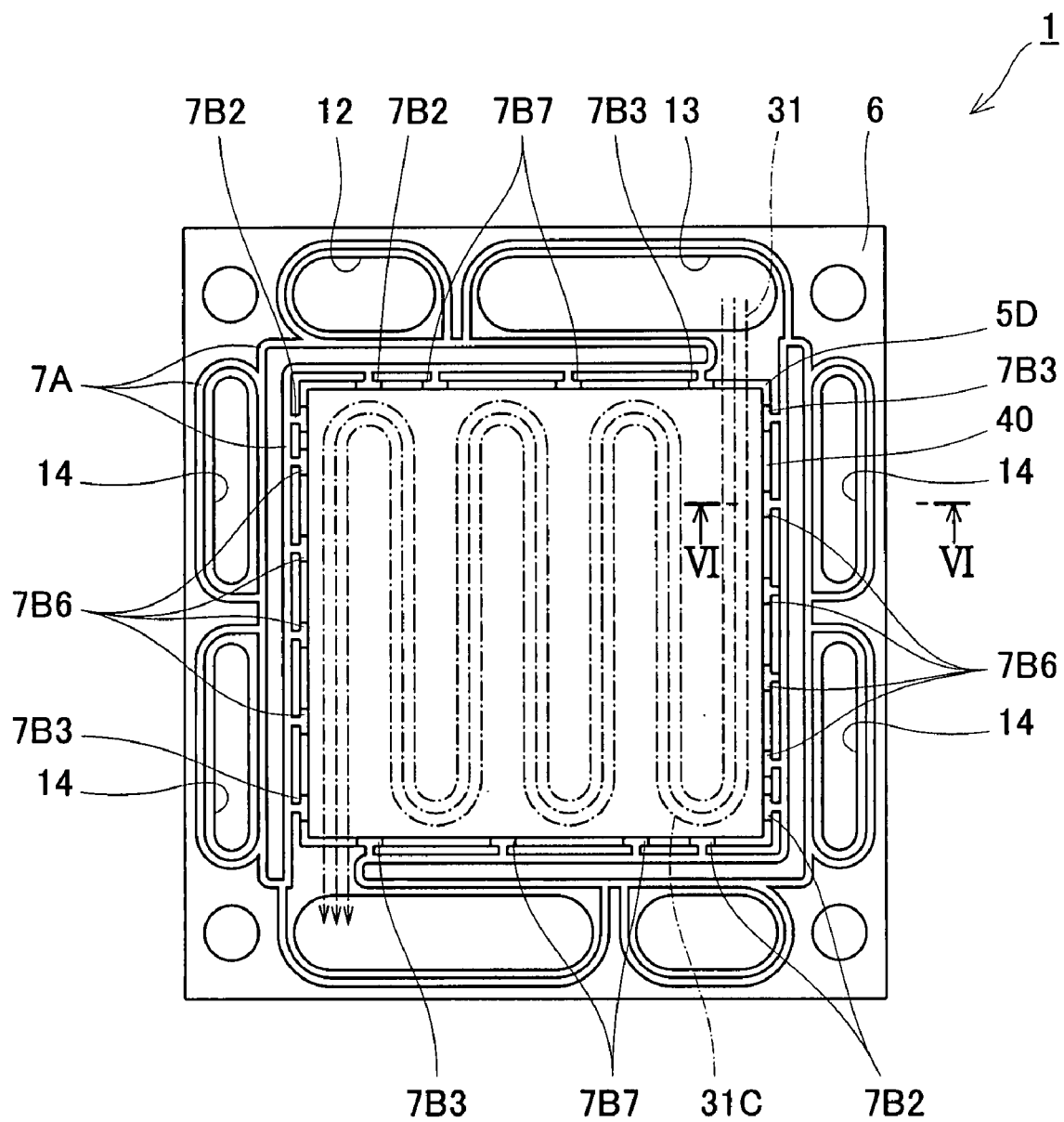
FIG. 4 is a plan view of a structure of the cathode separator side of the MEA shown in FIG. 1.

FIG. 3 is a plan view of the structure of the anode separator side of the MEA shown in FIG. 1. FIG. 4 is a plan view of the structure of the cathode separator side of the MEA shown in FIG. 1. Concretely, FIGS. 3, 4 show the positions which the fuel gas passage groove 21 of the anode separator plate 2 and the oxidizing gas passage groove 31 of the cathode separator plate 3 contact or face respectively, when the cells 10 are in an assembled condition.

As shown in FIGS. 3, 4, the MEA 1 of this embodiment is provided with the frame 6 formed in the peripheral region of the MEA body part 5, and the opposed main surfaces of the frame 6 are provided with the gaskets 7. The gas diffusion layers 5C are exposed at both sides of the central opening part of the frame 6 of the MEA 1, being apart from the frame 6 by providing the peripheral region 5D of the polymer electrolyte membrane 5A (see FIG. 2).

The frame 6 is a rectangular-plate-like frame which sandwiches the peripheral region 5D of the polymer electrolyte membrane 5A of the MEA body part 5 (see FIG. 2) and which is joined to the outer periphery of the polymer electrolyte membrane 5A. Provided in the frame 6 are a pair of fuel gas manifold holes 12, a pair of oxidizing gas manifold holes 13, two pairs of water manifold holes 14, and four bolt holes 4 (located in the vicinities of the corners of the frame 6) which all pass through the frame 6 in its thickness-wise direction. In this embodiment, the frame 6 is in the form of a rectangular flat plate having an external dimension of 200 mm×180 mm and a 124 mm-square opening part 26. The thickness of the frame 6 is 0.8 mm.

The gasket 7 on each main surface of the frame 6 has an annular portion 7A and an elongated portion 7B. The annular portion 7A is formed in annular form so as to extend along the inner periphery of the frame 6, whereas the elongated portion 7B is so formed as to extend from the annular portion 7A; pass over the inner periphery of the frame 6 and the peripheral region 5D of the polymer electrolyte membrane; and then come into contact with the side faces of the electrode layer (gas diffusion layer 5C).

The annular portions 7A each enclose the pair of fuel gas manifold holes 12, the pair of oxidizing gas manifold holes 13 and the two pairs of water manifold holes 14 and also enclose the gas diffusion layer 5C of the MEA body part 5. As discussed earlier, no gaskets 7 are provided in the regions with which the communicating portions 21B, 31B of the fuel gas passage groove 21 and oxidizing gas passage groove 31 are in contact when the cells 10 are in an assembled condition. On the anode separator plate 2 side, the annular portion 7A is formed so as to enclose the fuel gas manifold holes 12 and the MEA body part 5 in an integral fashion as shown in FIG. 3. On the cathode separator plate 3 side, the annular portion 7A is formed so as to enclose the oxidizing gas manifold holes 13 and the MEA body part 5 in an integral fashion as shown in FIG. 4. Thereby, the flow resistance of the communicating portions 21B, 31B of the fuel gas passage groove 21 and oxidizing gas passage groove 31 can be reduced while shutting off or restraining leakage of the fuel gas and oxidizing gas to the outside. Specifically, the annular portions 7A on opposed surfaces of the frame 6 are annularly formed so as to extend along the inner periphery of the frame 6. The annular portions 7A do not necessarily extend along the inner periphery (opening) of the frame 6 in the regions where a passage for flowing the fluid to be supplied to the MEA is formed (i.e., the respective regions which the communicating portions 21B, 31B contact).

The annular portions 7A of the gaskets 7 may be disposed in the respective regions with which the communicating portions 21B, 31B of the fuel gas passage groove 21 and oxidizing gas passage groove 31 are in contact when the cells 10 are in an assembled condition. In this case, the annular portions 7A of the gaskets 7 cause flow resistance in the communicating portions 21B, 31B of the fuel gas passage groove 21 and oxidizing gas passage groove 31, but this resistance does not interrupt the flows of the fuel gas and the oxidizing gas because the grooves have enough depth.

As illustrated in FIG. 2, an MEA body part peripheral gap 40 is formed between each annular portion 7A and each gas diffusion layer 5C of the MEA body part 5. The MEA body part peripheral gaps 40 are respectively blocked off or narrowed by the elongated portions 7B of the gaskets 7 as described later.

As illustrated in FIGS. 2, 3, at least parts of the ribs 7C of the annular portions 7A of the gaskets 7 are formed inward of the peripheral region 5D of the polymer electrolyte membrane 5A. In such a configuration, the pressing forces of the ribs 7C formed on the annular portions 7A on the front and rear surfaces of the MEA 1 make it possible to enhance the degree of adhesion and joint strength of the peripheral region 5D and the frame 6 when the cells 10 are in an assembled condition.

Further, grooves 6A are formed on opposed surfaces of the frame 6 where the annular portions 7A of the gaskets 7 run and the annular portions 7A are so formed as to fill the grooves 6A. The provision of the grooves 6A increases the degree of adhesion between the gaskets 7 and the frame 6.

Figure 5:
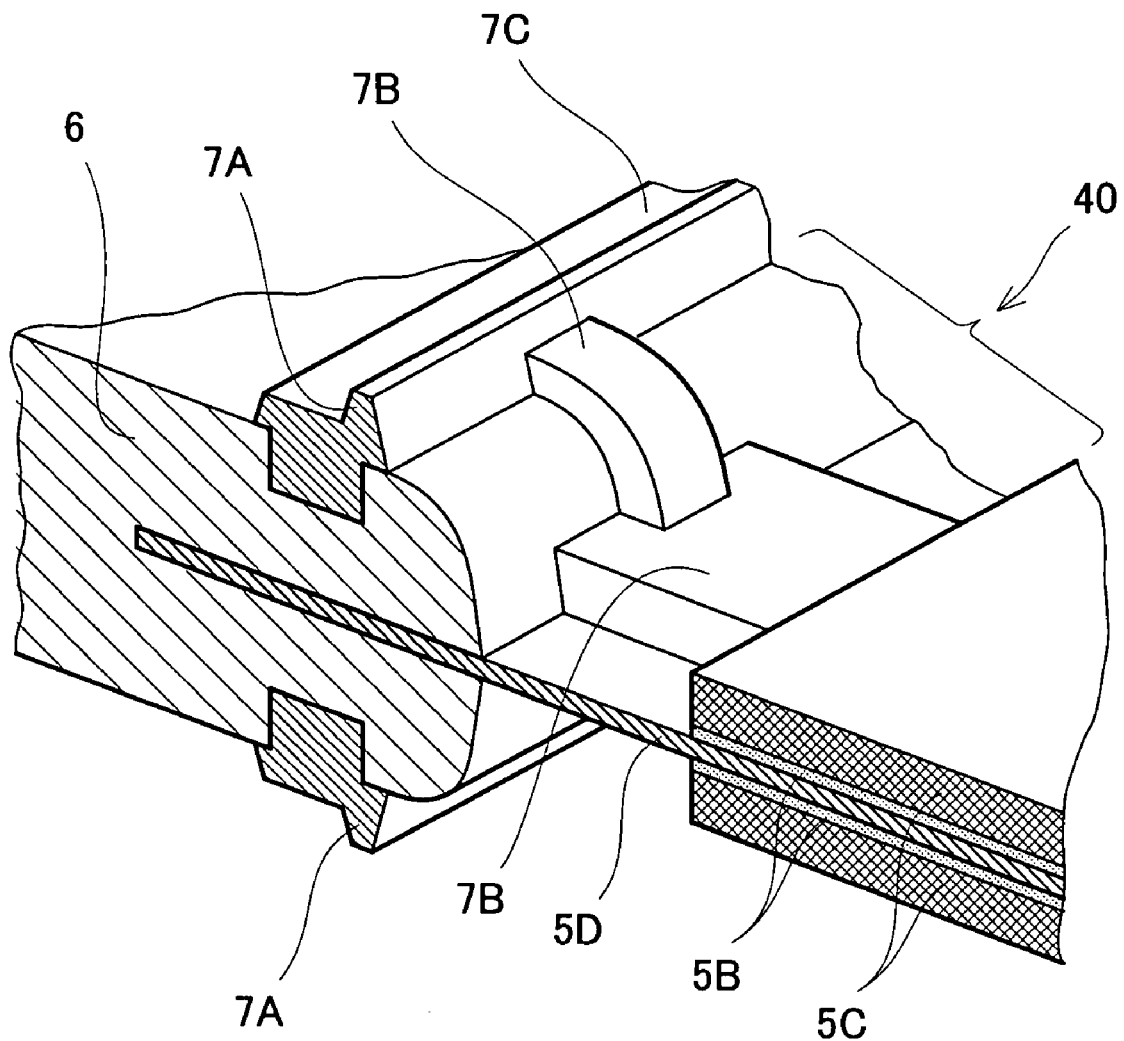
FIG. 5 is a sectional perspective view of the MEA, showing an elongated portion of a gasket.

FIG. 5 is a sectional perspective view of the MEA, showing the elongated portion of one of the gaskets 7. As illustrated in FIGS. 3 to 5, the elongated portion 7B extends from the annular portion 7A, running on the peripheral region 5D of the MEA body part 5 and then comes into contact with a side face of the electrode layer (gas diffusion layer 5C) so as to block off a part of the annular MEA body part peripheral gap 40. Thereby, the annular MEA body part peripheral gap 40 is at least partially shut off or narrowed by the elongated portion 7B of the gasket 7, when the cells 10 are in an assembled condition.

Herein, a plurality of elongated portions 7B are formed.

As illustrated in FIG. 3, in the surface on the anode separator plate 2 side, a first elongated portion 7B1 is formed on both sides of the positions which each communicating portion 21B contacts when the cells 10 are in an assembled condition. This makes it possible to shut off or restrain leakage of the fuel gas from each communicating portion 21B to the MEA body part peripheral gap 40, when the cells 10 are in an assembled condition. In the rear surface thereof, that is, the surface on the cathode separator plate 3 side, second elongated portions 7B2 are formed at positions corresponding to the first elongated portions 7B1, as illustrated in FIG. 4. In this arrangement, since the first elongated portions 7B1 are supported and pressed by the second elongated portions 7B2, the leakage of the fuel gas from the communicating portions 21B to the MEA body part peripheral gap 40 can be more unfailingly shut off or restrained.

Similarly, as illustrated in FIG. 4, in the surface on the cathode separator plate 3 side, a third elongated portion 7B3 is formed on both sides of the position which each communicating portion 31B contacts when the cells 10 are in an assembled condition. This makes it possible to shut off or restrain leakage of the oxidizing gas from each communicating portion 31B to the MEA body part peripheral gap 40, when the cells 10 are in an assembled condition. In the rear surface thereof, that is, the surface on the anode separator plate 2 side, fourth elongated portions 7B4 are formed at the positions corresponding to the third elongated portions 7B3, as illustrated in FIG. 3. In this arrangement, since the third elongated portions 7B3 are supported and pressed by the fourth elongated portions 7B4, the leakage of the oxidizing gas from the communicating portions 31B to the MEA body part peripheral gap 40 can be more unfailingly shut off or restrained.

As illustrated in FIG. 3, in cases where the gas diffusion layer contact portion 21A of the fuel gas passage groove 21 has a plurality of bent portions 21C located in the area corresponding to the periphery of the gas diffusion layer 5C, the gasket 7 on the anode separator plate 2 side of the MEA 1 has fifth elongated portions 7B5. The bent portions 21C are formed on the anode separator plate 2 and come into contact with the periphery of the gas diffusion layer 5C of the MEA 1 when the cells 10 are in an assembled condition. On the other hand, the MEA 1 is provided with the annular portion 7A that extends along the periphery of the gas diffusion layer 5C. Therefore, when the cells 10 are in an assembled condition, the annular portion 7A is in contact with the area in the vicinity of the space between every adjacent bent portions 21C.

The fifth elongated portions 7B5 are formed so as to extend from the annular portion 7A in the vicinities of the positions which the space between adjacent bent portions 21C of the anode separator plate 2 contacts when the cells 10 are in an assembled condition. By virtue of this, the fuel gas, which has not flown within the fuel gas passage groove 21 but has leaked from the bent portions 21C to the MEA body part peripheral gap 40, can be shut off or restrained from flowing within the MEA body part peripheral gap 40, so that the decline in the utilization efficiency of the fuel cell can be restrained. In addition, in the rear face thereof, that is, the surface on the cathode separator plate 3 side, sixth elongated portions 7B6 are formed at the positions corresponding to the fifth elongated portions 7B5 as shown in FIG. 4. In this arrangement, since the fifth elongated portions 7B5 are supported and pressed by the sixth elongated portions 7B6, the flow of the fuel gas within the MEA body part peripheral gap 40 can be more unfailingly shut off or restrained, restraining the decline in the utilization efficiency of the fuel gas.

Similarly, as illustrated in FIG. 4, in cases where the gas diffusion layer contact portion 31A of the oxidizing gas passage groove 31 has a plurality of bent portions 31C located in the area corresponding to the periphery of the gas diffusion layer 5C, the gasket 7 on the cathode separator plate 3 side of the MEA 1 has seventh elongated portions 7B7. The bent portions 31C are formed on the cathode separator plate 3 and come into contact with the periphery of the gas diffusion layer 5C of the MEA 1 when the cells 10 are in an assembled condition. On the other hand, the MEA 1 is provided with the annular portion 7A that extends along the periphery of the gas diffusion layer 5C. Therefore, when the cells 10 are in an assembled condition, the annular portion 7A is in contact with the vicinity of the space between every adjacent bent portions 21C.

The seventh elongated portions 7B7 are formed so as to extend from the annular portion 7A in the vicinities of the positions which the space between adjacent bent portions 31C of the cathode separator plate 3 contacts when the cells 10 are in an assembled condition. By virtue of this, the oxidizing gas, which has deflected from the oxidizing gas passage groove 31 and leaked from the bent portions 31C to the MEA body part peripheral gap 40, can be shut off or restrained from flowing within the MEA body part peripheral gap 40, so that the decline in the utilization efficiency of the oxidizing gas can be restrained. In addition, in the rear face thereof, that is, the surface on the anode separator plate 2 side, eighth elongated portions 7B8 are formed at the positions corresponding to the seventh elongated portions 7B7 as shown in FIG. 3. In this arrangement, since the seventh elongated portions 7B7 are supported and pressed by the eighth elongated portions 7B8, the flow of the oxidizing gas within the MEA body part peripheral gap 40 can be more unfailingly shut off or restrained, so that the decline of the utilization efficiency of the oxidizing gas can be restrained.

Next, a method for manufacturing the MEA1 will be described.

First, the MEA body part 5 is produced by forming, with a commonly used method, the catalyst layers 5B and the gas diffusion layers 5C on the opposed surfaces of the central part of the polymer electrolyte membrane 5A. For instance, these layers 5B, 5C are formed in the following way.

Firstly, the catalyst layers 5B are formed in the following way. Platinum is allowed to be carried by Ketjenblack EC (produced by Ketjen Black International Co., Ltd. specific surface: 800 m$^2$/g; DBP oil suction amount: 360 ml/100 g) at a weight ratio of 1:1. Then, 10 g of this catalyst powder is mixed with 35 g of water and 59 g of a hydrogen-ion conductive polyelectrolyte alcohol dispersion liquid (produced by Asahi Glass Co., Ltd. 9% FSS) and dispersed by use of an ultrasonic agitator, whereby a catalyst layer ink is prepared. This catalyst layer ink is sprayed onto opposed main surfaces of the polymer electrolyte membrane 5A to form 20 μm-thick layers which are, in turn, subjected to a thermal treatment at 115° C. for 20 minutes, thereby forming the catalyst layers 5B. During the spraying process, the polymer electrolyte membrane 5A is covered with a mask having an opening of 120 mm×120 mm. Herein, as the polymer electrolyte membrane 5A, a per fluorocarbon sulfonic acid membrane (produced by DuPont under the trade name of "Nafion 117" (registered trademark)) having a thickness of 50 μm and an external dimension of 140 mm×140 mm is used.

Then, the gas diffusion layers 5C are formed. The gas diffusion layers 5C are composed of a porous body having a large number of minute pores. The fuel gas and oxidizing gas penetrate into the pores and disperse so that they can easily reach the catalyst layers 5B. In this embodiment, each of the main surfaces of the polymer electrolyte membrane 5A on which the catalyst layer 5B is formed is covered with a 123 mm square carbon fiber cloth (produced by Gore Tex Inc. Japan under the name of "Carbel CL 400", thickness: 400 μm). Then, this carbon fiber cloth is hot-pressed under the following conditions: pressure=0.5 Mpa; temperature=135 degrees; time=5 minutes. As a result, the gas diffusion layer 5C is formed on the catalyst layer 5B of each main surface of the polymer electrolyte membrane 5A so as to be joined thereto.

Herein, a frame-like protective film 60 is further disposed on at least either one of the two main surfaces of the peripheral region 5D of the polymer electrolyte membrane 5A, for protecting the peripheral region 5D. With this protective film 60, the peripheral region 5D of the polymer electrolyte membrane 5A can be protected from damage during the manufacture of the MEA 1. A contact with the dies and compression caused by the injection pressure of the gaskets 7 are estimated as one of the causes of the damage.

Figure 12:
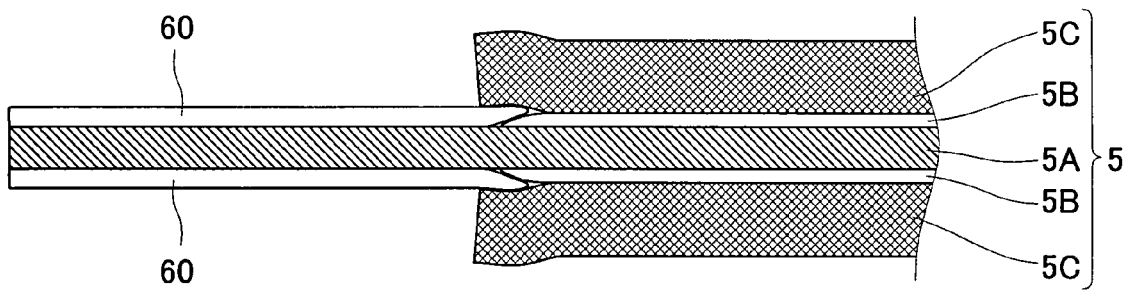
FIG. 12 is a cross-sectional view showing an interference condition of the peripheries of protective films and catalyst layers in a peripheral region of the MEA.
Figure 13:
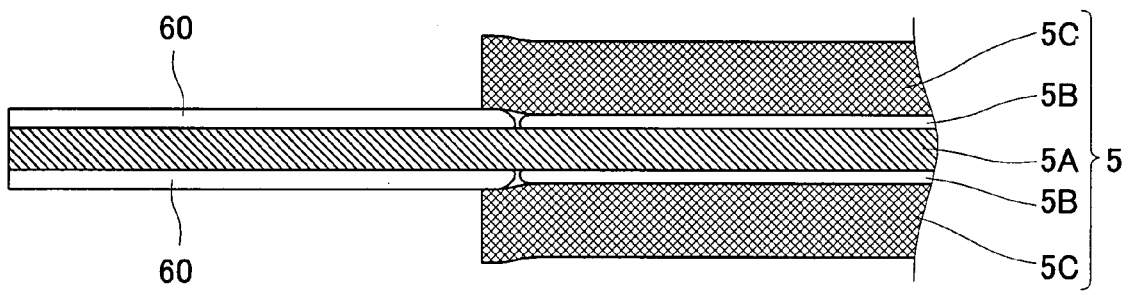
FIG. 13 is a cross-sectional view showing another interference condition of the peripheries of the protective films and catalyst layers in the peripheral region of the MEA.
Figure 14:
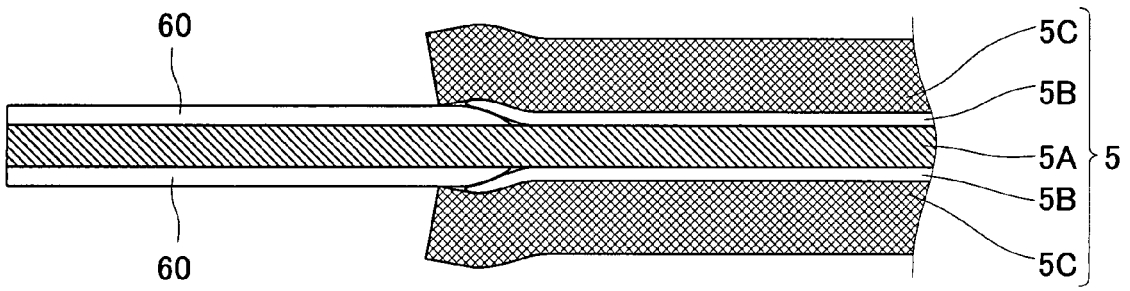
FIG. 14 is a cross-sectional view showing another interference condition of the peripheries of the protective films and catalyst layers in the peripheral region of the MEA.

FIGS. 12 to 14 are cross-sectional views each showing an interference condition of the inner peripheries of the protective films and the electrode layers in the peripheral region of the MEA.

FIG. 12 shows a configuration in which the inner periphery of each protective film 60 is laid between the catalyst layer 5B and the gas diffusion layer 5C. That is, the MEA 1 having the configuration in which the inner periphery of each protective film 60 is laid between the catalyst layer 5B and the gas diffusion layer 5C is manufactured by performing a step of arranging the protective films 60 after the step of forming the catalyst layers 5B. The peripheries of the catalyst layers 5B and the protective films 60 are compressed during the manufacturing step of the gas diffusion layers 5C.

FIG. 13 shows a configuration in which the protective layer 60 and the electrode layer (5B, 5C) are laid over each main surface of the polymer electrolyte membrane 5A such that they do not overlap each other but are placed side by side. In the manufacturing step of the MEA 1 of this configuration, there are no constraints on the order of the catalyst layer 5B formation step and the protective film 60 arrangement step. The outer peripheries of the catalyst layers 5B and the inner peripheries of the protective films 60 are elongated by compression exerted in a thickness-wise direction during the manufacturing step of the gas diffusion layers 5C, so that their peripheries become close to or come into contact with each other.

FIG. 14 shows a configuration in which the inner periphery of each protective film 60 is laid between the polymer electrolyte membrane 5A and the catalyst layer 5B. The MEA 1 of this configuration is manufactured by performing the catalyst layer 5B formation step after the protective film 60 arrangement step. The inner peripheries of the catalyst layers 5B and the inner peripheries of the protective films 60 are compressed during the manufacturing step of the gas diffusion layers 5C.

Although the gas diffusion layers 5C more or less bulge out in the area where the catalyst layers 5B and the inner peripheries of the protective films 60 overlap each other as illustrated in FIGS. 12, 14, the functions of the MEA 1 are not affected by this because the gas diffusion layers 5C are pressed and therefore flexed by the separator plates 2, 3 when the cells 10 are in an assembled condition. In addition, since the catalyst layers 5B and the protective films 60 do not have the same thickness as seen from FIG. 13, the gas diffusion layers 5C flex, being pressed by the separator plates 2, 3 when the cells 10 are in an assembled condition so that even if the outer peripheries of the gas diffusion layers 5 are more or less scabrous, the functions of the MEA 1 are not affected by it.

It is preferable that the protective films 60 be chemically inactive and non-viscous. In order to obtain a sufficient protective effect, the thickness of the protective films is preferably 10 to 50 μm and more preferably 10 to 30 μm. Therefore, materials stretchable to such an extent are suitably used. For instance, the material of the protective films 60 is selected from the group consisting of polyethylene, polypropylene, polybutylene, polyvinylidene chloride, polyvinyl alcohol, polyacrylamide, polyamide, polycarbonate, silicone, fluorocarbon resin, polybutylene terephthalate, polyethylene terephthalate, polyethylene naphthalate, polyphenylene sulfide, polyether ether ketone, polyether ketone, liquid crystalline polymer, polyethernitrile, modified polyphenylene ether, polysulfone, polyethersulfone, polyarylate, polyamide-imide, polyetherimide and thermoplastic polyimide.

It should be noted that even if only one face of the polymer electrolyte membrane 5A is covered with the protective film 60, damage to the peripheral region 5D from the adhered surface side can be prevented.

Next, the frame 6 is formed on the peripheral region 5D of the MEA body part 5.

FIG. 6 is a manufacturing process chart schematically illustrating the cross-section of the MEA taken along line IV-IV of FIGS. 3 and 4 to explain the steps of manufacturing the MEA.

Figure 6A:
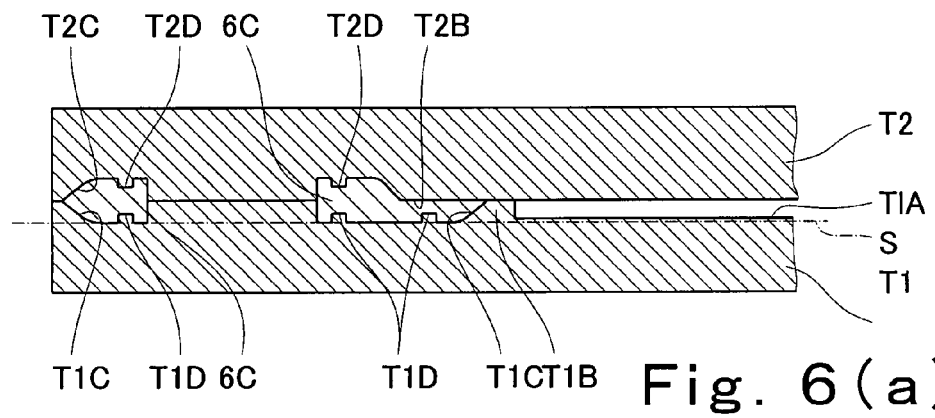
FIG. 6 is a manufacturing process chart schematically illustrating the cross-section of the MEA taken along line IV-IV of FIGS. 3 and 4 to explain the steps for manufacturing the MEA.

In the first step, a molded member 6C that is a part of the frame 6 is formed. As shown in FIG. 6(a), a first die T1 and a second die T2 are coupled together and the thermoplastic resin that is the material of the molded member 6C i.e., the frame 6 is fed by injection or the like into the gap between the first and second dies T1, T2, thereby forming the molded member 6C. Formed in the inner peripheral region of the molded member 6C is a flat part 6C1 in which the peripheral region 5D of the MEA body fixed part 5 is placed.

The first die T1 is configured such that a frame body part T1C has a shape corresponding to the shape of the molded member 6C, which is the shape of the lower half portion of the frame 6. Provided in an in-frame portion of the first die T1 is a flat part T1B in which the peripheral region 5D of the MEA body part 5 can be placed. Specifically, the flat part T1B has a top face that extends from the inner rim of the frame body part T1C in substantially parallel with a frame face S of the molded part 6C, i.e., a frame face of the frame 6. Further, a recessed part T1A is formed in the in-frame portion of the first die T1. In the recessed part T1A, the MEA body part 5 in a flat condition can be accommodated. That is, the recessed part T1A is a flat face which is located within the in-frame portion of the first die T1 defined by an extension of the top face of the flat part T1B, the area of which is an area about several millimeters larger than the gas diffusion layer 5C and the depth of which from the top face of the flat part 1B is substantially corresponding to the total thickness of one catalyst layer 5B and one gas diffusion layer 5C of the MEA body part 5.

The second die T2 is configured such that a frame body part T2C forms the molded member 6C, i.e., the upper half portion of the frame 6. Note that a flat part T2B is formed in the inner peripheral portion of the second die T2 such that the peripheral region 5D of the MEA body part 5 can be placed therein. Specifically, the flat part T2B has a top face that is in partial contact with the top face of the flat part T1B of the first die T1 and extends toward the outer periphery of the frame so as to have an area larger than the peripheral region 5D of the MEA 1.

The frame body parts T1C, T2C are provided with convex parts T1D, T2D, respectively, which surround the positions of the gaskets 7, i.e., the manifold holes 12, 13, 14 and surround the opening of the frame 6. Herein, the convex parts T1D, T2D have a depth of about 0.5 mm and width of about 0.5 mm when viewed in cross-section. Thereby, the grooves 6A are formed within the molded member 6C, that is, the frame 6. Another configuration may be employed in which the frame body parts T1C, T2C are formed without the convex parts T1D, T2D and the grooves 6A may be formed by cutting after formation of the frame 6.

The frame body parts T1C, T2C have a shape that allows formation of the manifold holes 12, 13, 14. Thereby, the manifold holes 12, 13, 14 can be formed by molding. Note that the frame body parts T1C, T2C may be formed without the manifold holes 12, 13, 14 and the manifold holes 12, 13, 14 may be formed by cutting or punching the frame 6.

Figure 6B:
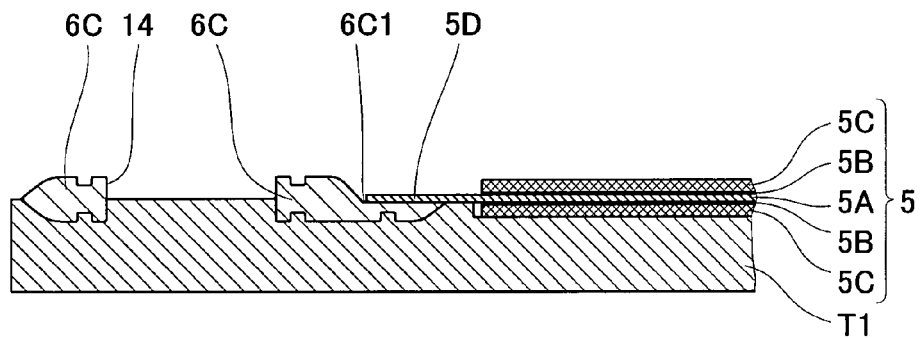

In the second step, the second die T2 is removed from the molded member 6C, while the MEA body part 5 in a flat condition being left within the in-frame portion of the molded member 6C fitted in the first die T1 and the peripheral region 5D of the MEA body part 5 being left in the flat part 6C1. More specifically, as shown in FIG. 6(b), the polymer electrolyte membrane 5A, which is covered with the protective film 60 laid around the MEA body part 5, is located on the flat part 6C1 of the molded member 6C and the gas diffusion layers 5C are located within the recessed part T1A of the first die T1. Accordingly, the MEA body part 5 is placed in a flat manner.

Figure 6C:
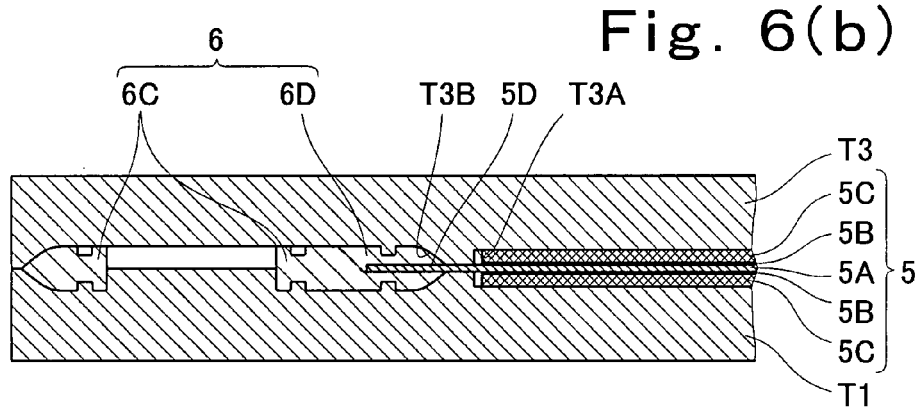

In the third step, the frame 6 to which the MEA body part 5 is adhered is manufactured. More concretely, as shown in FIG. 6(c), a third die T3 is fit to the first die T1 in which the molded member 6C having the MEA body part 5 disposed therein is fit. Herein, the third die T3 has a recessed part 3A at a position that interferes with the gas diffusion layer 5C similarly to the first die, such that the third die T3 does not come into contact with the gas diffusion layer 5C. That is, the recessed part T3A and the recessed part T1A have the similar shape. This makes it possible to prevent the interference between the third die T3 and the gas diffusion layer 5C in the third step so that damage to the MEA body part 5 can be avoided.

Then, the thermoplastic resin for the frame 6 is fed by injection or the like into the gap between the first die T1 and the third die T3, that is, the position of an MEA body fixed part 6D, so that the frame 6 is formed integrally with the molded member 6C. The third die T3 is configured so as to make the flat part 6C1 of the molded member 6C have a shape corresponding to the upper half portion of the frame 6. Specifically, the MEA body fixed part 6D is formed in the gap between a frame body part T3B of the third die T3 and the molded member 6C.

Figure 6D:
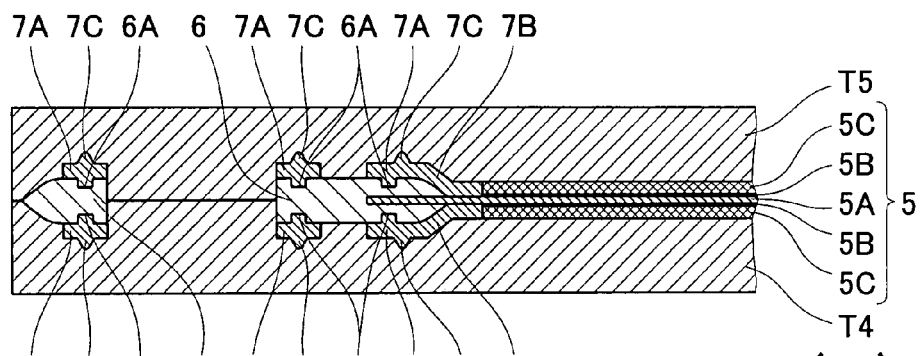

In the fourth step, the gaskets 7 are formed in the frame 6 to which the MEA body part 5 is joined, and thereby the MEA 1 is manufactured. As shown in FIG. 6(d), the frame 6 to which the MEA body part 5 is joined is removed from the first die T1 and the third die T3 and then held between a fourth die T4 and a fifth die T5. Subsequently, the fourth die T4 and the fifth die T5 are coupled each other. The thermoplastic resin or thermoplastic elastomer, which is the material of the gaskets 7, is fed by injection or the like into the gap between the fourth die T4 and the frame 6 and the gap between the fifth die T5 and the frame 6, thereby forming the gaskets 7 on the opposed surfaces of the frame 6. The fourth die T4 and fifth die T5 are configured to form the annular portions 7A and elongated portions 7B of the gaskets 7 and form the ribs 7C on the annular portions 7A.

As described above, the MEA 1 manufacturing method of the invention is a molding process except the second step in which the MEA body part 5 is placed. Accordingly, the MEA 1 is manufactured within a molding machine and the MEA body part 5 which has been produced beforehand is delivered to and placed in the molding machine in the second step. Therefore, the MEA 1 manufacturing method of the invention is suited for the mass-production of the MEA 1 which is required to have high fuel gas and oxidizing gas utilization efficiencies.

In addition, use of slide dies or rotary dies makes it possible to continuously carry out the first to third steps within a single molding machine. Thereby, the process can be further simplified and the mass productivity of the MEA 1 can be further increased.

Next, the function during operation of the PEFC 100 will be described.

The fuel gas to be supplied to the PEFC 100 flows in one of the fuel gas manifolds and then diverges from one of the fuel gas manifold hole 22 of the anode separator plate 2 to the fuel gas passage groove 21. After exposed to the MEA body part 5, the fuel gas goes to the other fuel gas manifold through the other fuel gas manifold hole 22 and flows in this fuel gas manifold to be discharged from the PEFC 100. Similarly, the oxidizing gas flows in one of the oxidizing gas manifolds and is discharged through the other oxidizing gas manifold. Although there is concern that, in the communicating portions 21B of the fuel gas passage groove 21, the fuel gas may leak to the MEA body part peripheral gap 40, the leak of the fuel gas can be shut off or restrained because the MEA body part peripheral gap 40 is blocked off or narrowed, at both sides of each communicating portion 21B, by the first elongated portions 7B1 of the gaskets 7. That is, the fuel gas, which flows between the pair of fuel gas manifolds 22 by way of the MEA body part peripheral gap 40, deflecting from the gas diffusion layer contact portion 21A, can be shut off or restrained. Although there is also concern that, in the bent portions 21C of the gas diffusion layer contact portion 21A of the fuel gas passage groove 21, the fuel gas may leak to the MEA body part peripheral gap 40, the flow of the fuel gas in the MEA body part peripheral gap 40 can be shut off or restrained because the MEA body part peripheral gap 40 is blocked off or narrowed at every adjacent bent portions 21C by the fifth elongated portions 7B5, so that the decline in the fuel gas utilization efficiency can be restrained. As to the oxidizing gas, the MEA body part peripheral gap 40 is blocked off and narrowed by the third elongated portions 7B3 and seventh elongated portions 7B7 of the gaskets 7 and therefore the oxidizing gas, which flows between the pair of oxidizing gas manifolds 33 by way of the MEA body part peripheral gap 40, deflecting from the gas diffusion layer contact portion 31A, can be shut off or restrained. Also, the flow of the oxidizing gas leaking from the bent portions 31C of the gas diffusion layer contact portion 31A within the MEA body part peripheral gap 40 can be shut off or restrained.

While the embodiments of the invention have been described in detail hereinabove, it is apparent that the invention is not necessarily limited to these particular embodiments and various changes and modifications are made to the disclosed embodiments without departing from the spirit and scope of the invention. Examples of such modifications are as follows.

(Modification 1)

The gaskets 7 can be adhered to the frame 6 by fusing. Thereby, stronger connection can be achieved.

In a modification of the grooves 6A, if the gaskets 7 are made from a material having a plastic component common to the frame 6, the frame 6 and the gaskets 7 can be thermally fused to each other, thereby establishing strong connection. Alternatively, the grooves 6A may be eliminated, thereby further simplifying the structure of the MEA 1. For instance, glass fiber added polypropylene (produced by Idemitsu Petrochemical Co., Ltd. under the name of "R350G") is used for the frame 6. Suntplene 8101-55 (produced by Advanced Elastomer System Co., Ltd.) is used for the gaskets 7. Since the gaskets 7 and the frame 6 both contain polypropylene as a plastic component, the gaskets 7 are integrally fused to the frame 6 when molding the gaskets 7, so that a strong joint structure free from peel off and other structural defects can be attained.

(Modification 2)

In another modification of the grooves 6A, a sequence of through holes may be formed as a groove 6A. That is, since the gaskets 7 formed on the opposed surfaces of the frame 6 are coupled to each other by the through holes in the third step, the degree of adhesion between the frame 6 and the gaskets 7 can be enhanced.

(Modification 3)

Figure 7:
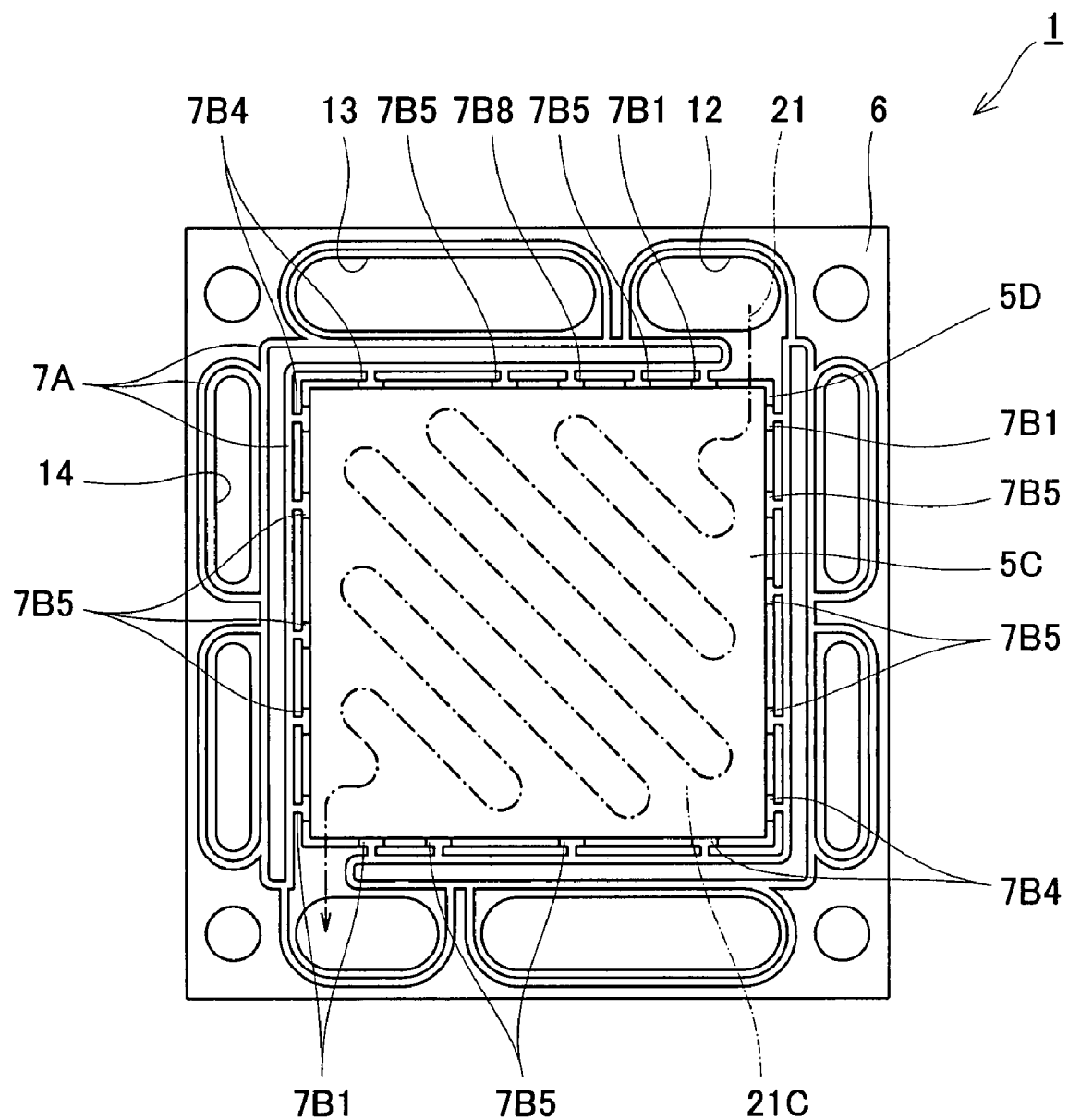
FIG. 7 is a plan view of the anode separator side of the MEA of FIG. 1 that is modified in accordance with a modified fuel gas passage groove.
Figure 8:
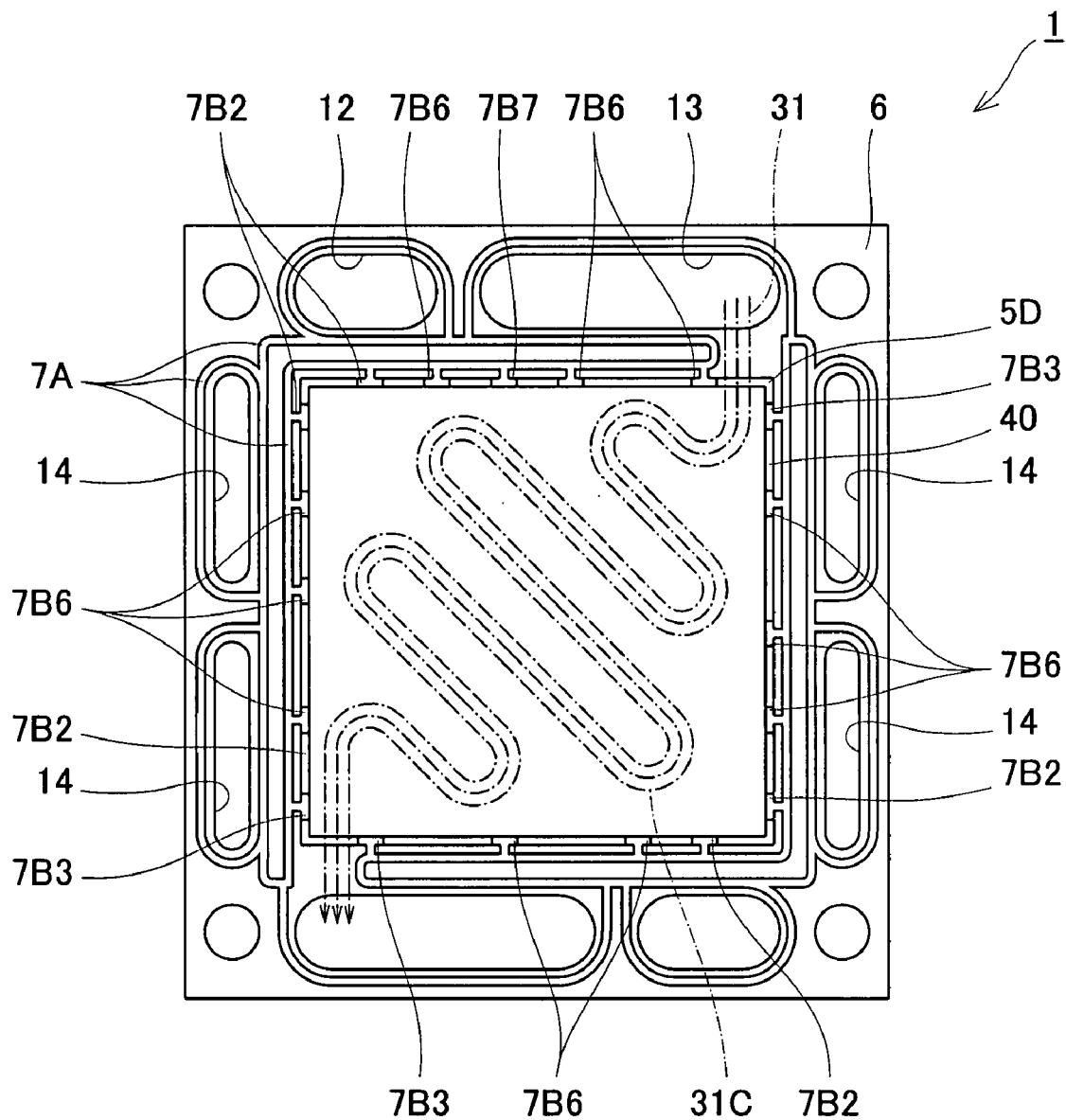
FIG. 8 is a plan view of the cathode separator side of the MEA of FIG. 1 that is modified in accordance with a modified oxidizing gas passage groove.

In the MEA 1, the fifth to eighth elongated portions 7B5, 7B6, 7B7, 7B8 are arranged to correspond to the positions of the bent portions 21C, 31C of the fuel gas passage groove 21 and the oxidizing gas passage groove 31. FIG. 7 is a plan view of the anode separator side of the MEA of FIG. 1 that is modified in accordance with a modification of the fuel gas passage groove. FIG. 8 is a plan view of the cathode separator side of the MEA of FIG. 1 that is modified in accordance with a modification of the oxidizing gas passage groove. These figures show the positions which the fuel gas passage groove 21 of the anode separator plate 2 and the oxidizing gas passage groove 31 of the cathode separator plate 3 contact or face respectively when the cells 10 are in an assembled condition. If there are provided the bent portions 21C and bent portions 31C which are located at corresponding positions on the front surface and rear surface, respectively, of the MEA body part 5 as shown in the drawings, some of the seventh and eighth elongated portions 7B7, 7B8 are unnecessary because of the provision of the fifth and sixth elongated portions 7B5, 7B6. If the gas diffusion layer contact portion 21A of the fuel gas passage groove 21 and the gas diffusion layer contact portion 31A of the oxidizing gas passage groove 31 meander in the same direction on the front and rear surfaces, respectively, of the MEA body part 5, the number of fifth and sixth elongated portions 7B5, 7B6 which overlap each other and the number of seventh and eighth elongated portions 7B7, 7B8 which overlap each other further increase and therefore the number of elongated portions 7B can be cut.

(Modification 4)

Figure 9:
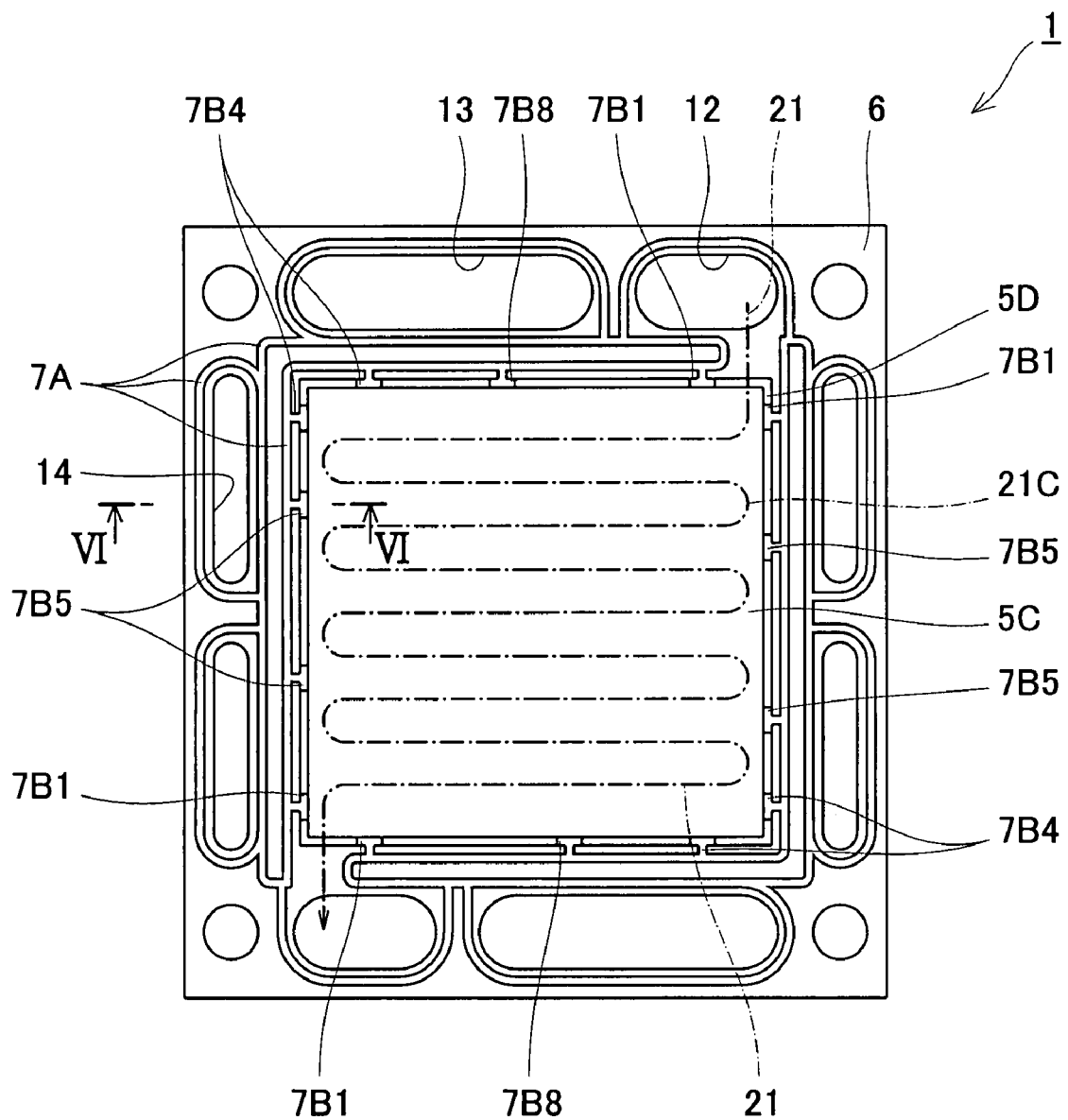
FIG. 9 is a plan view of the anode separator side of the MEA of FIG. 1, which shows the forming positions of fifth elongated portions 7B5 and eighth elongated portions 7B8 according to a modification.
Figure 10:
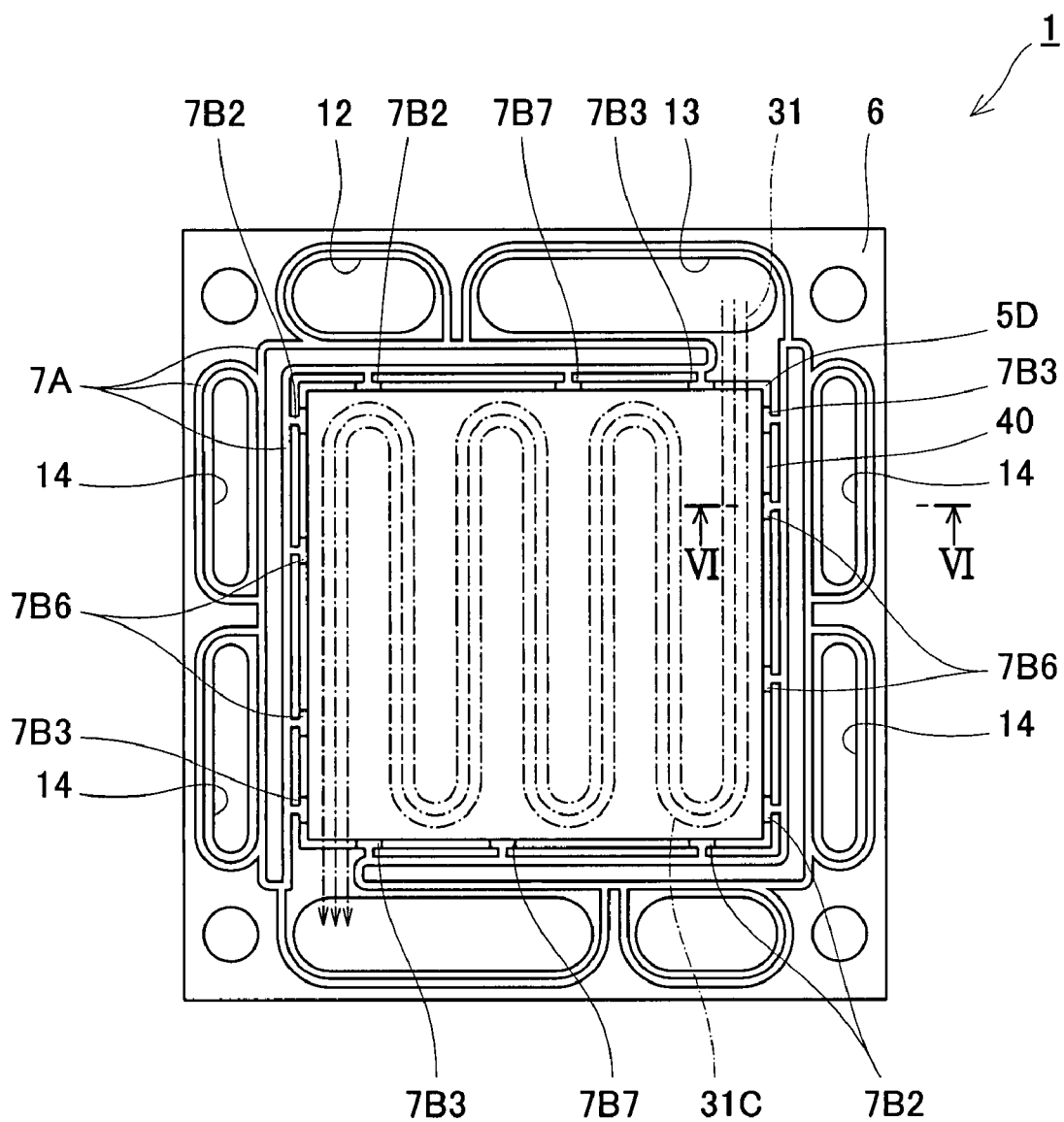
FIG. 10 is a plan view of the cathode separator side of the MEA of FIG. 1, which shows the forming positions of sixth elongated portions 7B6 and seventh elongated portions 7B7 according to a modification.

FIG. 9 is a plan view of the anode separator side of the MEA of FIG. 1, which shows the forming positions of the fifth elongated portions 7B5 and the eighth elongated portions 7B8 according to a modification. FIG. 10 is a plan view of the cathode separator side of the MEA of FIG. 1, which shows the forming positions of the sixth elongated portions 7B6 and the seventh elongated portions 7B7 according to a modification. As illustrated in these figures, only some of the positions which the space between adjacent bent portions 21C, 31C contact are provided with the fifth elongated portion 7B5 and the seventh elongated portion 7B7. Even though the fifth and seventh elongated portions 7B5, 7B7 are not provided between every adjacent bent portions 21C, 31C, a noticeable decline does not occur in the fuel gas and oxidizing gas utilization efficiencies of the PEFC 100, owing to the number of passage grooves 21, 31; the passage configuration or groove shape of the passage grooves 21, 31; the gas permeability of the gas diffusion layers 5C; the flowing speed of the fuel gas and the oxidizing gas in the passage grooves 21, 31; the pressure loss of the passage grooves 21, 31; and the dew points of the fuel gas and the oxidizing gas. In short, the fifth and seventh elongated portions 7B5, 7B7 can be eliminated depending on the fuel gas and oxidizing gas passage conditions of the PEFC 100. Thus, the number of positions where the sixth and eighth elongated portions 7B6, 7B8 are formed can be reduced, resulting in further simplification of the structure of the MEA 1.

(Modification 5)

Figure 15:
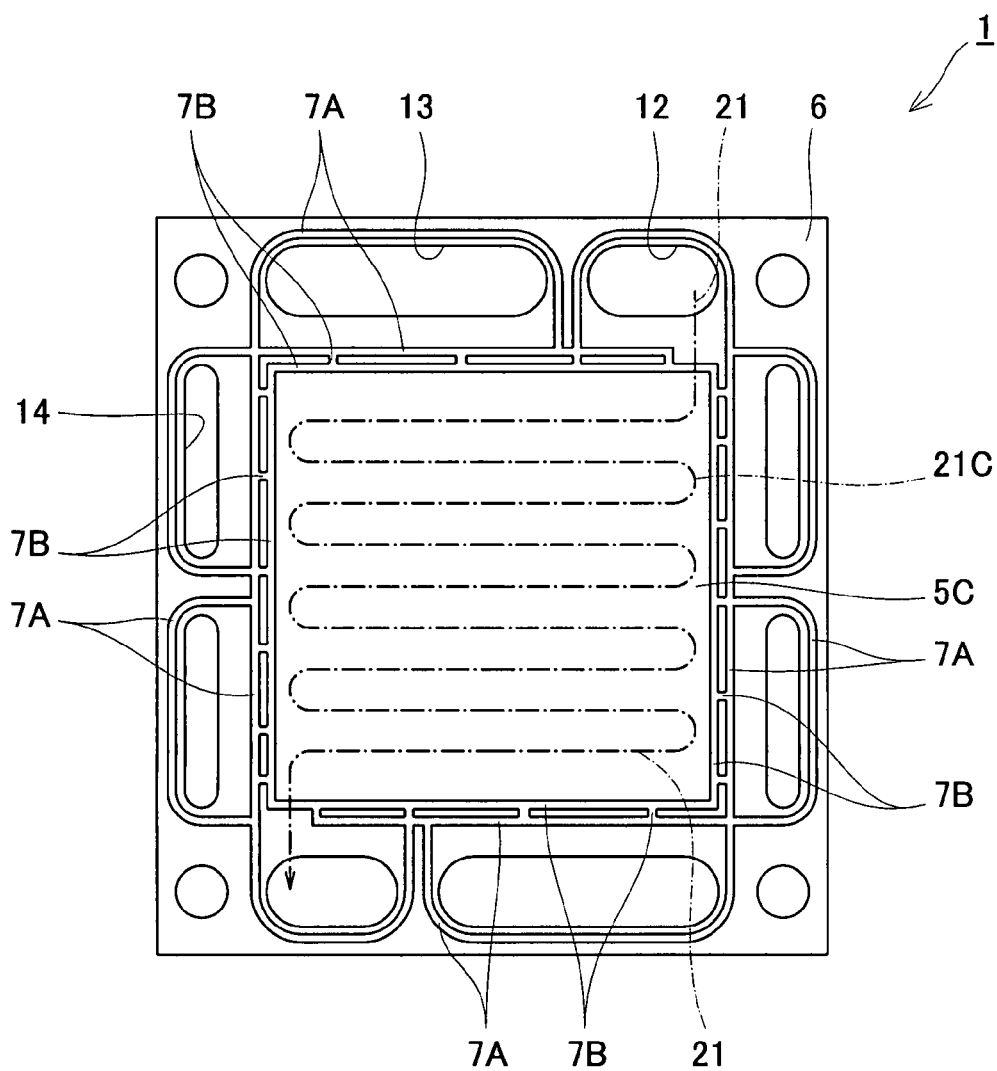
FIG. 15 is a plan view of a structure of the anode separator side of an MEA according to a fifth modification.

FIG. 15 is a plan view of a structure of the anode separator side of an MEA according to Modification 5. As illustrated in FIG. 15, Modification 5 is designed such that the annular portion 7A is so formed as to have a single structure, instead of the double structure, in the area between each of the manifold holes 12, 13, 14 and the MEA body part 5. Whereas the double structure uses two parallel gaskets 7, the single structure uses a single gasket 7 for partitioning the manifold holes. This simplifies the structure of the annular portions 7A.

In addition, the elongated portion 7B is formed in contact with the entire side faces of the electrode layer (gas diffusion layer 5C). Specifically, the elongated portion 7B extends from the annular portion 7A to the side faces of the electrode layer (gas diffusion layer 5C), passing over the peripheral region 5D of the MEA body part 5, such that the annular MEA body part peripheral gap 40 is partially blocked off. Then, the fore-end parts of the elongated portion 7B extending from the annular portion 7A stretch on the peripheral region 5D to contact each other so that the peripheral region 5D is substantially entirely covered by the elongated portion 7B. With such a structure, the outflow of the gases from the side faces of the electrode layers (gas diffusion layers 5C) can be substantially perfectly prevented by the elongated portions 7B so that the leakage of the fuel gas and oxidizing gas from the fuel gas passage groove 21 and oxidizing gas passage groove 31 into the MEA body part peripheral gaps 40 can be more unfailingly shut off or restrained.

(Modification 6)

Figure 16:
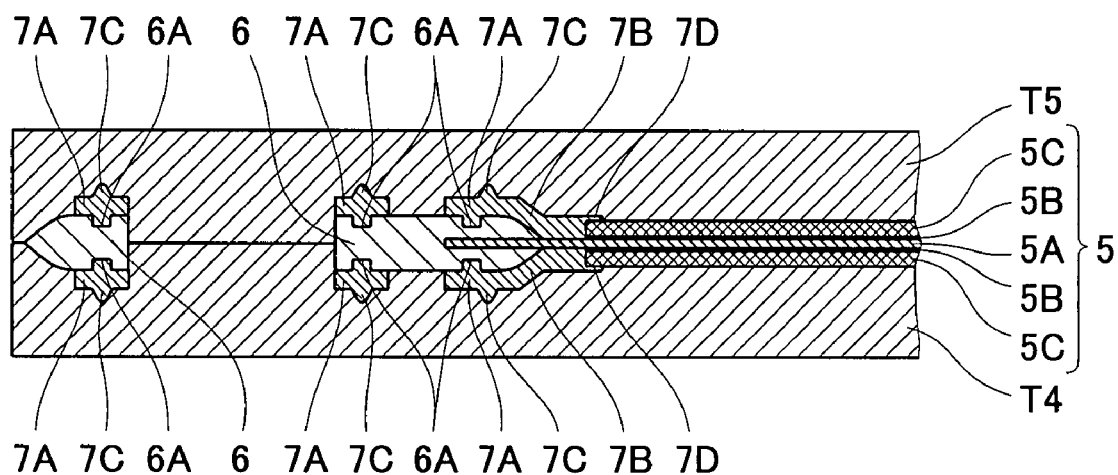
FIG. 16 is a view schematically showing a cross-section of an MEA taken along line VI-VI of FIGS. 3 and 4 when a fourth manufacturing step is carried out according to a sixth modification.

FIG. 16 is a view schematically showing a cross-section of an MEA taken along line VI-VI of FIGS. 3 and 4 when the fourth manufacturing step is carried out according to Modification 6. As illustrated in FIG. 16, in Modification 6, an overlap part 7D is formed at the fore end of the elongated portion 7B of each gasket 7. Each overlap part 7D is thinly elongated, and runs onto the surface of its associated gas diffusion layer 5C. The overlap part 7D thus formed is sandwiched between the gas diffusion layer 5C and the separator plate 2 (3) so as to be pressed by them when the cells 10 are in an assembled condition, so that the degree of adhesion between the elongated portion 7B and the gas diffusion layer 5C can be further increased. As a result, the leakage of the fuel gas and the oxidizing gas from the fuel gas passage groove 21 and the oxidizing gas passage groove 31 can be more reliably shut off or restrained.

EXAMPLES

More details of the invention will be described below by way of an example. It is however apparent that the invention is not limited to these embodiments.

Example 1

In this example, an output performance test was conducted on the PEFC 100. In the output performance test, while keeping the feeding conditions of the fuel gas and the oxidizing gas and the output conditions of the PEFC 100 constant, output voltage V per cell 10 was measured. These conditions are as follows: the humidity of the fuel gas to be fed is 65° C. (the dew point); the humidity of the oxidizing gas to be fed is 65° C. (the dew point); the oxidizing gas utilization efficiency is 40%; the fuel gas utilization efficiency is 75%; the temperature of the PEFC 100 is 65° C. and the current density is 0.08 A/cm$^2$. The output condition of the PEFC 100 is such that the PEFC 100 is subjected to partial load and the pressure loss of the fuel gas and the oxidizing gas is low.

(Comparison 1)

In this comparison, an output performance test was conducted on a PEFC under the same conditions as of Example 1, which PEFC was prepared by modifying the PEFC 100 such that the gaskets 7 formed in the frame 6 were replaced with gaskets having no elongated portion 7B, that is, gaskets having only the annular portions 7A.

Figure 11:
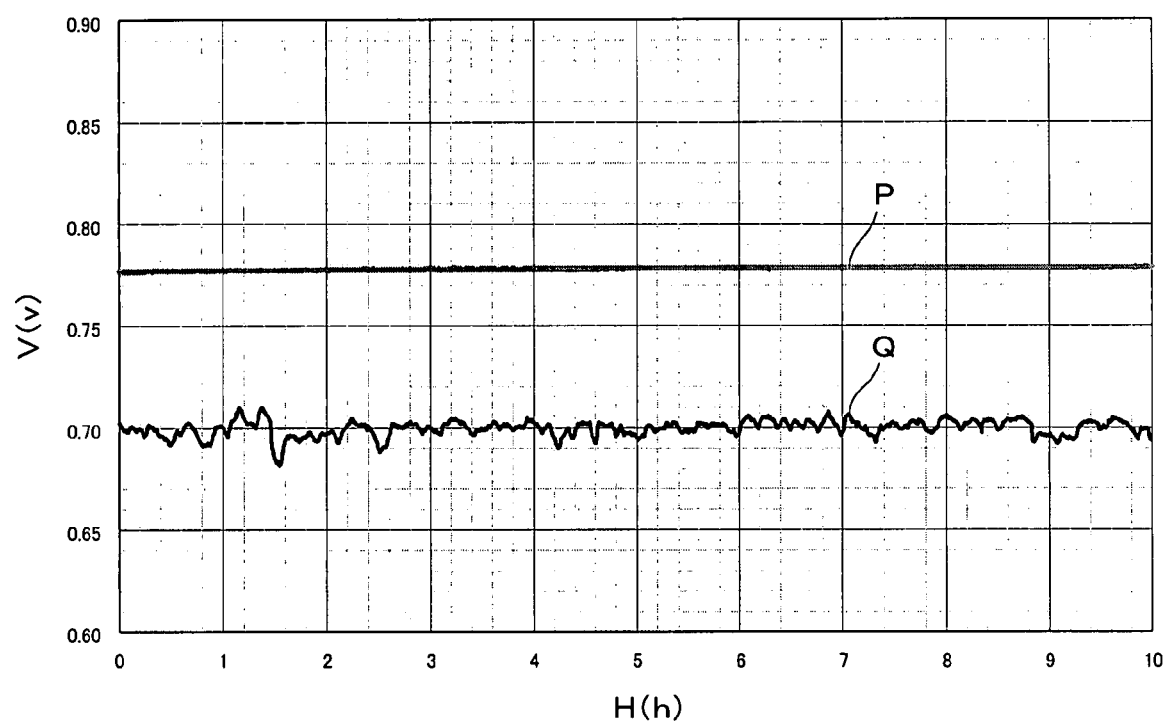
FIG. 11 is a graph showing, in comparison, the output performances of a PEFC according to Example 1 and a PEFC according to Comparative Example under the same condition.

FIG. 11 is a graph showing, in comparison, the output performance of the PEFC of Example and the output performance of the PEFC of Comparison under the same condition. As seen from FIG. 11, the output voltage of Example P is higher and more stable than the output voltage of Comparison Q.

According to the MEA 1 of the invention, the manufacturing method thereof, and the PEFC 100 using the MEA 1, flow of the fuel gas and the oxidizing gas in the MEA body part peripheral gaps 40 when the PEFC 100 is in an assembled condition can be shut off or restrained, so that the fuel gas and oxidizing gas utilization efficiencies can be increased. In addition, the structure of the MEA 1 and the MEA 1 manufacturing method are simple and therefore suited for the mass-production of the MEA 1.

INDUSTRIAL APPLICABILITY

The invention provides a useful MEA, MEA manufacturing method and polymer electrolyte fuel cell using the MEA which are capable of shutting off or restraining flows of the fuel gas and oxidizing gas in the MEA body part peripheral gaps when the polymer electrolyte fuel cell is in its assembled condition so that the fuel gas and oxidizing gas utilization efficiencies increase and which are simple and therefore suited for mass-production.

The invention claimed is:

1. A MEA for use in a polymer electrolyte fuel cell having a separator plate in which a passage groove is formed in a surface in contact with either of electrode layers, said passage groove having a plurality of bent portions in a peripheral region of said electrode layer, said MEA comprising:
    an MEA body part having a polymer electrolyte membrane and a pair of electrode layers that are formed on opposed surfaces, respectively, of said polymer electrolyte membrane, which are located inward of a peripheral region of said polymer electrolyte membrane;
    a frame that sandwiches said peripheral region of said polymer electrolyte membrane with a gap between said frame and said pair of electrode layers and encloses an outer periphery of said polymer electrolyte membrane; and
    a pair of gaskets that are formed on opposed surfaces of said frame so as to sandwich said frame therebetween and are made of at least one material selected from a group consisting of thermoplastic resins and thermoplastic elastomers,
    wherein said gaskets each have an annular portion that is annularly formed so as to extend along an inner periphery of said frame and elongated portions disposed at said peripheral region of said polymer electrolyte membrane such that the elongated portions extend from said annular portion in the vicinities of positions of said polymer electrolyte membrane which regions between adjacent bent portions contact and block the gap between said frame and said electrode layers.

2. The MEA according to claim 1 for use in a polymer electrolyte fuel cell having a separator plate provided with communicating passage grooves each of which is formed so as to extend from a surface in contact with either of said electrode layers to a surface facing an area around said electrode layer,
    wherein said elongated portions extend from said annular portion so as to be located on both sides of positions of said MEA at which said communicating passage grooves respectively contact.

3. The MEA according to claim 1, wherein said elongated portions extend from said annular portion in a part of the vicinities of positions of said MEA which regions between adjacent bent portions contact.

4. The MEA according to claim 1, wherein a composition of said frame and a composition of said gaskets include the same plastic component.

5. The MEA according to claim 1, wherein fore ends of said elongated portions of said gaskets are in contact with substantially entire side faces of said electrode layers.

6. The MEA according to claim 1,
wherein a frame-like protective film is further disposed on said peripheral region of at least one of two main surfaces of said polymer electrolyte membrane, for protecting said peripheral region;
wherein said electrode layers each have a layered structure that includes a gas diffusion layer and a catalyst layer disposed between said gas diffusion layer and said polymer electrolyte membrane; and
wherein an inner periphery of said protective film fits in a space between said catalyst layer and said gas diffusion layer.

7. The MEA according to claim 1,
wherein a frame-like protective film is further disposed on said peripheral region of at least one of two main surfaces of said polymer electrolyte membrane, for protecting said peripheral region; and
wherein said protective film and associated one of said electrode layers are apposed on said main surface of said polymer electrolyte membrane so as not to overlap each other.

8. The MEA according to claim 1,
wherein a frame-like protective film is further disposed on said peripheral region of at least one of two main surfaces of said polymer electrolyte membrane, for protecting said peripheral region;
wherein said electrode layers each have a layered structure that includes a gas diffusion layer and a catalyst layer disposed between said gas diffusion layer and said polymer electrolyte membrane; and
wherein an inner periphery of said protective film fits in the space between said polymer electrolyte membrane and said catalyst layer.

9. The MEA according to claim 1,
wherein a rib is formed on a top face of said annular portion of each gasket so as to extend in an extending direction of said annular portion, and at least a part of said rib is formed inward of said peripheral region of said polymer electrolyte membrane.

10. The MEA according to claim 1,
wherein fore ends of said elongated portions of each gasket are thinly elongated over and run onto surfaces of said electrode layers.

11. A MEA manufacturing method for manufacturing an MEA according to claim 1, comprising the steps of:
feeding a thermoplastic resin into a gap between a first die and a second die to form a frame-like molded member having a flat part formed on an inner peripheral side thereof;
placing an MEA body part that has been prepared beforehand in a flat manner within said frame-like molded member fit in the first die and placing a peripheral region of said MEA body part on said flat part;
forming a frame connected to said MEA body part by coupling a third die with the first die in which said molded member having said MEA body part arranged therein is fit and, then, feeding said thermoplastic resin into a gap between the first die and the third die; and
forming gaskets on surfaces of said frame by coupling a fourth die and fifth die with each other with said frame having said MEA body part joined thereto being held therebetween and then feeding a thermoplastic resin or thermoplastic elastomer into a gap between the fourth die and the fifth die, wherein said gaskets each have an annular portion that is annularly formed so as to extend along an inner periphery of said frame and elongated portions that extend from said annular portion in the vicinities of positions of said MEA which regions between adjacent bent portions contact, pass over the inner periphery of said frame and said peripheral region of said polymer electrode membrane, and come into contact with side faces of their associated one of said electrode layers.

12. A polymer electrolyte fuel cell comprising a stack of one or more cells each having said MEA recited in claim 1 and anode and cathode separators that sandwich said MEA therebetween.

* * * * *